(12) United States Patent
Higashiyama et al.

(10) Patent No.: US 11,544,455 B2
(45) Date of Patent: Jan. 3, 2023

(54) INFORMATION PROCESSING DEVICE, INFORMATION PROCESSING METHOD, AND RECORDING MEDIUM

(71) Applicant: NEC Corporation, Tokyo (JP)

(72) Inventors: Shohei Higashiyama, Tokyo (JP); Yuzuru Okajima, Tokyo (JP); Kunihiko Sadamasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 384 days.

(21) Appl. No.: 16/623,033

(22) PCT Filed: Jun. 21, 2017

(86) PCT No.: PCT/JP2017/022782
§ 371 (c)(1),
(2) Date: Dec. 16, 2019

(87) PCT Pub. No.: WO2018/235177
PCT Pub. Date: Dec. 27, 2018

(65) Prior Publication Data
US 2021/0150143 A1 May 20, 2021

(51) Int. Cl.
*G06F 40/253* (2020.01)
*G06F 40/20* (2020.01)
(Continued)

(52) U.S. Cl.
CPC ............ *G06F 40/20* (2020.01); *G06F 40/211* (2020.01); *G06F 40/253* (2020.01); *G06F 40/289* (2020.01); *G06N 5/042* (2013.01)

(58) Field of Classification Search
CPC ...... G06F 40/20; G06F 40/253; G06F 40/211; G06F 40/289; G06N 5/042; G06N 20/00;
(Continued)

(56) References Cited

FOREIGN PATENT DOCUMENTS

GB 0853286 B1 * 6/2005
JP 2006-139708 A * 6/2006
(Continued)

OTHER PUBLICATIONS

Chikara Hashimoto, et al., "Large-Scale Verb Entailment Acquisition from the Web", Transactions of Information Processing Society of Japan, Jan. 15, 2011, pp. 293 to 307, vol. 52, No. 1.
Asuka Sumida, et al., "Clustering a Large Number of Event Relations that Have Different Arguments by Using Distributional Similarity", IPSJ SIG Technical Reports, Dec. 15, 2010, pp. 1 to 5, vol. 2010-NPL-199, No. 4.
(Continued)

*Primary Examiner* — Richemond Dorvil
*Assistant Examiner* — Derrick Scott Jefferies
(74) *Attorney, Agent, or Firm* — Sughrue Mion, PLLC

(57) ABSTRACT

An information processing device according to the present invention includes: a memory; and a processor coupled to the memory. The processor performs operations. The operations includes: generating, based on language data, a predicate argument structure including a predicate and an argument being an object of the predicate; generating first data indicating co-occurrence of the predicate and the argument in the predicate argument structure; decomposing the first data into a plurality of pieces of second data including fewer elements than elements included in the first data, and generating, based on the second data, third data including potential co-occurrence of the predicate and the argument; selecting the predicate argument structure by using the first data and the third data, and calculating, by using the third data, a score for a pair of the predicate argument structures including the selected predicate argument structure; and selecting the pair, based on the score.

4 Claims, 15 Drawing Sheets

(51) Int. Cl.
*G06F 40/211* (2020.01)
*G06F 40/289* (2020.01)
*G06N 5/04* (2006.01)

(58) Field of Classification Search
CPC ............. G10L 21/0208; G10L 21/0364; G10L 25/27; G10L 25/84
See application file for complete search history.

(56) References Cited

FOREIGN PATENT DOCUMENTS

| JP | 201165317 A | * | 3/2011 |
| JP | 2011-108192 A | | 6/2011 |
| WO | 2013/058118 A1 | | 4/2013 |

OTHER PUBLICATIONS

Shuya Abe, et al., "Combining Pattern-Based and Ancher-Based Approaches for Event Relation Acquisition", IPSJ SIG Technical Reports, Jul. 10, 2008, pp. 19 to 24, vol. 2008, No. 67.
Kayo Tatsukawa, et al., "A Study on Introducing Constraint Knowledge for NMF Initial Value Setting", Proceedings of the Twentieth Annual Meeting of the Association for Natural Language Processing [online], Mar. 10, 2014, pp. 936 to 938.
International Search Report for PCT/JP2017/022782 dated Sep. 12, 2017 (PCT/ISA/210).
Written Opinion for PCT/JP2017/022782 dated Sep. 12, 2017 (PCT/ISA/237).

* cited by examiner (GRILL [PREDICATE], FISH [OBJECT], ON A GRILL [INSTRUMENT])
→
(COOK [PREDICATE], FISH [OBJECT], ON A GRILL [INSTRUMENT])

Fig. 5

ORIGINAL CO-OCCURRENCE TENSOR X

| | CUT | COOK | DRINK | POUR |
|---|---|---|---|---|
| TOMATO | 5.00 | 3.00 | | |
| GREEN PEPPER | 3.00 | | | |
| CARROT | | 4.00 | | |
| TEA | | | 4.00 | 6.00 |
| COFFEE | | | 3.00 | 5.00 |
| COLA | | | 4.00 | |

INFORMATION PROCESSING DEVICE, INFORMATION PROCESSING METHOD, AND RECORDING MEDIUM

CROSS REFERENCE TO RELATED APPLICATIONS

This application is a National Stage of International Application No. PCT/JP2017/022782 filed Jun. 21, 2017, the disclosure of which is incorporated herein in its entirety by reference.

TECHNICAL FIELD

The present invention relates to information processing, and, in particular, relates to an information processing device and the like that process information relevant to a language.

BACKGROUND ART

For processing of understanding a meaning in a predetermined language, or, for processing of achieving inference in a predetermined language, a certain amount of knowledge (prior knowledge) in large quantity and in a predetermined range is necessary in advance. One type of such knowledge is inter-event implication relation knowledge.

The event is an expression in a language that represents some kind of event. In case grammar, which is one of grammar theories for linguistic analysis, the event is represented by using a predicate argument structure that includes a predicate and zero or more arguments.

The predicate is a word that describes a course of an event, and is generally a verb. However, some theories include, in addition to a verb, an adjective, a noun, or the like as a predicate. In an example to be used for description below, a verb will be used as a predicate. However, this does not limit the present invention to a verb.

Further, the argument is an element that is essential for description of an event. Generally, a "case" is used as a classification of an argument. Examples of a case include an agent being a subject of action for a predicate, an object being an object of a predicate, a goal being a goal of a predicate, an instrument being a means relevant to a predicate, and the like.

Further, the implication relation knowledge is knowledge relevant to an implication relation between two events. The implication relation between events is a relation that, when one event (hereinafter, referred to as an "antecedent", since one event is generally expressed prior to a next event) holds, then another event (hereinafter, also referred to as a "consequent") holds inevitably or with high probability. For example, in the case that, when an event P (antecedent) holds, then an event Q (consequent) holds inevitably or with high probability, an event pair composed of the events P and Q is in an implication relation. Note that an implication relation in an event pair as described above is generally represented as "P→Q". The implication relation knowledge is knowledge that includes an event pair in such an implication relation.

A technique of acquiring an implication relation from a set of computer-processable language data or character data (hereinafter, also referred to as "texts") has been studied (for example, see Patent Literatures (PTLs) 1 and 2, and Non-Patent Literature (NPL) 1).

A technique disclosed in PTL 1 (hereinafter, referred to as a "first related art") identifies a combination of predicate argument structures by comparing vectors of predicate argument structures in two texts. Then, the first related art determines an implication relation between texts on the basis of a feature amount of the combination.

A technique disclosed in PTL 2 (hereinafter, referred to as a "second related art") is a technique for improving precision in classifying topics of an image and a medium other than an image in sample data. First, the second related art decomposes a topic co-occurrence probability matrix including feature amount vectors of topics as elements, into a potential topic co-occurrence probability matrix and a potential topic weight matrix. Then, the second related art calculates, from the potential topic co-occurrence probability matrix, a potential topic co-occurrence probability related to each of an image and a medium other than an image.

A technique disclosed in NPL 1 (hereinafter, referred to as a "third related art") extracts implication relation knowledge from a text on the basis of information on an argument (shared argument) shared by a predicate pair.

Specifically, the third related art extracts a predicate argument structure from an input text, and decomposes the extracted predicate argument structure into sets of a predicate and one argument. Then, the third related art counts frequency of appearance of each set (frequency of co-occurrence of a predicate and an argument included in the set), and constructs a frequency-of-co-occurrence database composed of "a predicate, an argument, and frequency of co-occurrence". Next, the third related art selects a "pair of predicate argument structures" sharing an identical argument, on the basis of the frequency-of-co-occurrence database. The pair of predicate argument structures sharing an identical argument is, for example, a pair of predicate argument structures for which "v1≠v2 ∧ a1=a2" holds in a predicate argument structure (predicate v1 and argument a1) and a predicate argument structure (predicate v2 and argument a2).

Then, the third related art calculates a score (hereinafter, referred to as "score 1" in description of the third related art) indicating strength of relation as implication relation knowledge in the pair of predicate argument structures. Subsequently, the third related art calculates a score (hereinafter, referred to as "score 2" in description of the third related art) integrating scores 1 of all pairs of predicate argument structures including an identical "pair of predicates". The score 2 is a value that indicates strength of relation as implication relation knowledge in a predicate pair. The third related art selects a pair of predicates having a score 2 satisfying a predetermined condition (for example, the score 2 is greater than a threshold value). Then, the third related art adds the selected pair of predicates to a set of implication relation knowledge.

CITATION LIST

Patent Literature

[PTL 1] International Publication No. WO 2013/058118
[PTL 2] Japanese Unexamined Patent Application Publication No. 2011-108192

Non Patent Literature

[NPL 1] Chikara HASHIMOTO, Kentaro TORISAWA, Kow KURODA, Stijn D E SAGER, Masaki MURATA, Jun'ichi KAZAMA, "Large-Scale Verb Entailment Acquisition from the Web" Transactions of Information Processing Society of Japan, Vol. 52, No. 1, Jan. 15, 2011, pages 293 to 307

SUMMARY OF INVENTION

Technical Problem

An event pair sharing no argument may also be in an implication relation.

However, the third related art is unable to determine strength of relation for an event pair sharing no identical argument in a text to be treated. In other words, the third related art has an issue of being unable to extract, as implication relation knowledge, an event pair sharing no argument but having an implication relation.

When arguments included in an event are increased, possibility of sharing at least some arguments between events is increased. As sharing of an argument, the third related art is able to also process sharing of an argument in an event pair including a plurality of arguments.

However, when arguments included in an event are increased, the event rarely occurs in a text. Thus, increasing arguments included in an event does not always solve the above-described issue.

Further, the first and second related arts are not a technique relevant to processing on an event pair sharing no argument.

As described above, PTLs 1 and 2, and NPL 1 have an issue of being unable to select a pair of predicate argument structures including no co-occurrence observed in language data but having possibility of co-occurrence, that is, a pair of predicate argument structures including potential co-occurrence.

An object of the present invention is to solve the above-described issue and provide an information processing device and the like that select a pair of predicate argument structures being in a potential co-occurrence relation in language data.

Solution to Problem

An information processing device according to one aspect of the present invention includes:

a memory; and at least one processor coupled to the memory.

The processor performs operations. The operations includes:

generating, based on language data, a predicate argument structure including a predicate and an argument being an object of the predicate;

generating first data indicating co-occurrence of the predicate and the argument in the predicate argument structure;

decomposing the first data into a plurality of pieces of second data including fewer elements than elements included in the first data, and generating, based on the second data, third data including potential co-occurrence of the predicate and the argument;

selecting the predicate argument structure by using the first data and the third data, and calculating, by using the third data, a score for a pair of the predicate argument structures including the selected predicate argument structure; and selecting the pair, based on the score.

An information processing system according to one aspect of the present invention includes:

the above-mentioned information processing device;

a transmission device that acquires the language data and transmits the language data to the information processing device; and a reception device that receives the selected pair from the information processing device and stores the pair.

An information processing method according to one aspect of the present invention includes:

generating, based on language data, a predicate argument structure including a predicate and an argument being an object of the predicate;

generating first data indicating co-occurrence of the predicate and the argument in the predicate argument structure;

decomposing the first data into a plurality of pieces of second data including fewer elements than elements included in the first data;

generating, based on the second data, third data including potential co-occurrence of the predicate and the argument;

selecting the predicate argument structure by using the first data and the third data;

calculating, by using the third data, a score for a pair of the predicate argument structures including the selected predicate argument structure; and selecting the pair, based on the score.

A computer-readable recording medium according to one aspect of the present invention embodies a program. The program causes a computer to perform a method.

The method includes:

generating, based on language data, a predicate argument structure including a predicate and an argument being an object of the predicate;

generating first data indicating co-occurrence of the predicate and the argument in the predicate argument structure;

decomposing the first data into a plurality of pieces of second data including fewer elements than elements included in the first data;

generating, based on the second data, third data including potential co-occurrence of the predicate and the argument;

selecting the predicate argument structure by using the first data and the third data;

calculating, by using the third data, a score for a pair of the predicate argument structures including the selected predicate argument structure; and selecting the pair, based on the score.

Advantageous Effects of Invention

The present invention exhibits an advantageous effect of being able to select a pair of predicate argument structures being in a potential co-occurrence relation in language data.

BRIEF DESCRIPTION OF DRAWINGS

FIG. 5 is a diagram illustrating one example of an original co-occurrence tensor used for description of a potential generation unit.

EXAMPLE EMBODIMENT

Figure 1:
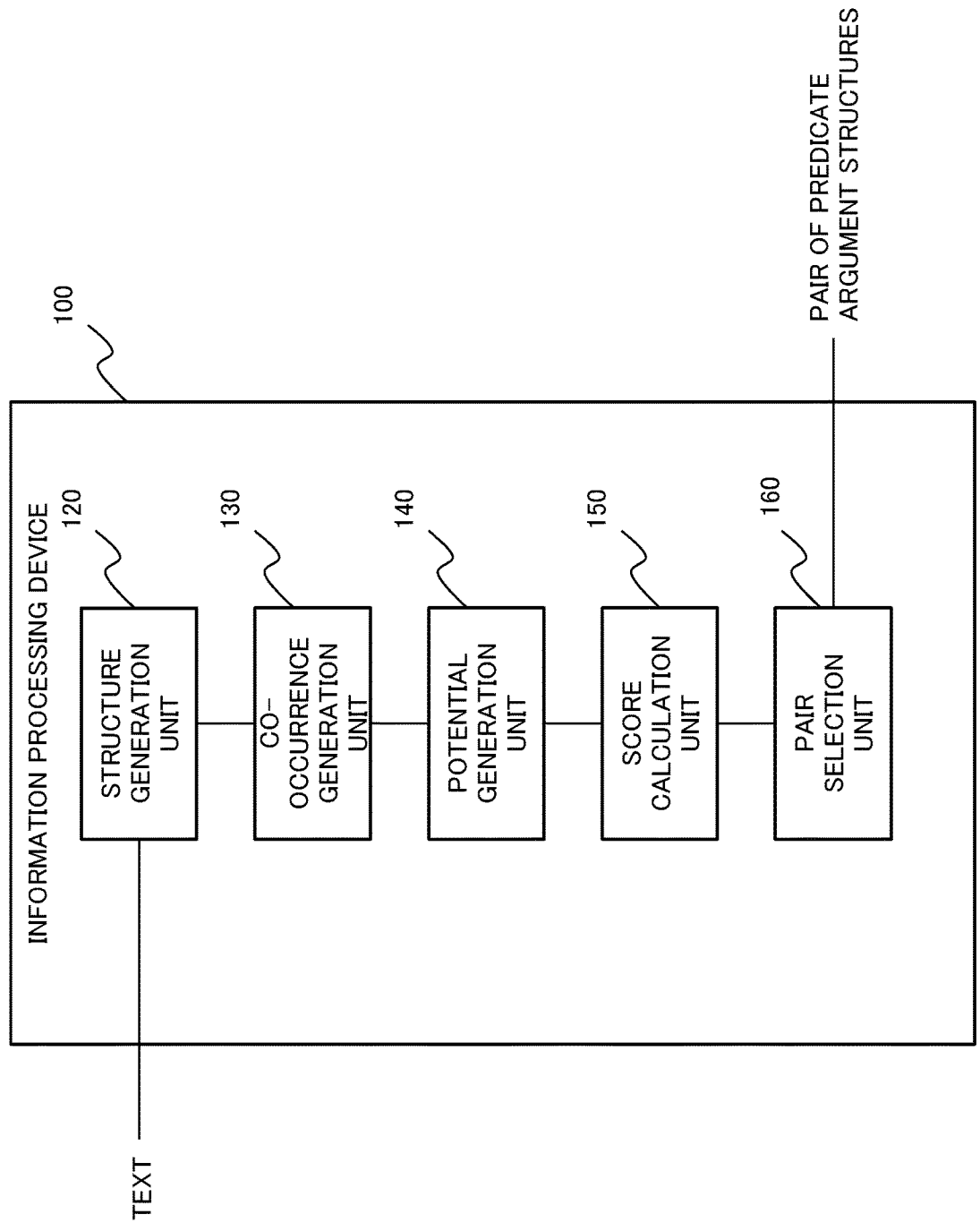
FIG. 1 is a block diagram illustrating one example of a configuration of an information processing device according to a first example embodiment of the present invention.

Next, example embodiments of the present invention will be described with reference to the drawings.

The drawings are intended for description of the example embodiments of the present invention. However, the present invention is not limited to the description of the drawings. Further, similar components in the drawings are assigned with the same numbers, and repeated description thereof may be omitted. Further, in the drawings used for the following description, description of a configuration in a part unrelated to the description of the present invention may be omitted and may be unillustrated.

According to the example embodiment of the present invention, data relevant to a language (hereinafter, referred to as "language data") are processed.

Any format of language data to be processed may be applicable. For example, a format of data may be a text format or a binary format. Alternatively, language data may be data including metadata or data relevant to a language hierarchy within language data, like Hyper-Text Markup Language.

In addition, any structure of a language may be used in processing, as long as co-occurrences between elements included in a structure and between structures can be defined. In the following, description will be given by using a predicate argument structure as one example of a structure.

In addition, co-occurrence in a language to be processed may have any semantic content. For example, one example of a semantic content is an implication relation in an event pair. The implication relation in an event pair is that when a prior event (antecedent P) of an event pair (for example, "P→Q") holds, a posterior event (consequent Q) holds.

In addition, any data configuration may be used in specific processing. For example, a data configuration used in processing may be a matrix, or may be a tensor which is also an extension of a matrix. In the following, description will be given by using, as a data configuration, a tensor and/or a matrix as appropriate. However, this is not intended to limit a data configuration of the present invention to a tensor and the like.

The present invention is not limited to data, a format thereof, a configuration thereof, and the like that are used in the following description.

First Example Embodiment

Hereinafter, a first example embodiment will be described below with reference to the drawings.

SUMMARY

An information processing device 100 according to the first example embodiment generates, on the basis of language data, data (hereinafter, referred to as "first data") indicating co-occurrence of a predicate and an argument in a predicate argument structure of the language data.

Then, the information processing device 100 converts the first data into predetermined data (hereinafter, referred to as "second data"), and generates, on the basis of the second data, data (hereinafter, referred to as "third data") including potential co-occurrence of the predicate and the argument in the predicate argument structure.

Herein, the potential co-occurrence is co-occurrence, which is not explicitly co-occurrence in language data (in other words, which is not observed in language data), of a predicate and an argument in a predicate argument structure. A difference between the first data and the third data is the potential co-occurrence.

Then, the information processing device 100 calculates an evaluation value (hereinafter, referred to as a "score") of a "pair of predicate argument structures" including a "predicate argument structure having a value of potential co-occurrence greater than a predetermined threshold value.

Then, the information processing device 100 selects a pair of predicate argument structures having a score satisfying a predetermined condition.

The selected pair of predicate argument structures is a candidate for implication relation knowledge potentially existing in the language data.

The score for a pair of predicate argument structures is, for example, a value indicating a degree (for example, a probability) of a consequent holding when an antecedent holds in a pair of predicate argument structures (that is, a degree of an antecedent implying a consequent). A value of the score may be a higher value as higher the above degree is, or may be a lower value as higher the degree is. However, in the following description, it is assumed that a value of the score is a higher value as higher the above degree is. In other words, in the following description, the score is a higher value as higher is a degree of a consequent holding when an antecedent holds. However, the score according to the present example embodiment is not limited to the above.

[Description of Configuration]

First, a configuration of an information processing device 100 according to the first example embodiment of the present invention will be described with reference to the drawings.

FIG. 1 is a block diagram illustrating one example of the configuration of the information processing device 100 according to the first example embodiment of the present invention.

The information processing device 100 includes a structure generation unit 120, a co-occurrence generation unit 130, a potential generation unit 140, a score calculation unit 150, and a pair selection unit 160.

Each configuration may transmit a result of processing to another configuration. Alternatively, when the information processing device 100 includes an unillustrated storage unit, each configuration may store a processing result in the storage unit, and may read out necessary information from the storage unit. Thus, in the following description, description about transmission and reception of information between configurations will be omitted.

The structure generation unit 120 generates a predicate argument structure included in language data. For example, the structure generation unit 120 analyzes a structure of language data by using a predetermined analytical approach (for example, morphological analysis, dependency structure analysis, or predicate argument structure analysis). Then, the structure generation unit 120 generates a predicate argument structure from the language data on the basis of an analysis result.

The structure generation unit 120 may be provided with language data from any source. For example, the structure generation unit 120 may acquire language data from an unillustrated external device. Alternatively, the structure generation unit 120 may acquire language data from an unillustrated storage unit. Alternatively, the structure generation unit 120 may acquire language data from an unillustrated configuration (for example, an unillustrated processing unit or data acquisition unit) included in the information processing device 100.

In addition, the structure generation unit 120 may acquire, in addition to language data, information (hereinafter, referred to as "linguistic analysis information") for use in generating a predicate argument structure. The linguistic analysis information is a result of morphological analysis, a result of dependency structure analysis, a result of predicate argument structure analysis of language data, and/or the like. In this case, the structure generation unit 120 generates a predicate argument structure by using the linguistic analysis information.

The co-occurrence generation unit 130 generates, on the basis of the language data and the predicate argument structure, data (first data) indicating co-occurrence of a predicate and an argument in the predicate argument structure.

For example, the co-occurrence generation unit 130 may calculate, as data indicating co-occurrence, frequency of appearance of the predicate argument structure in the language data. Alternatively, the co-occurrence generation unit 130 may normalize frequency of appearance by using a predetermined approach.

Hereinafter, description will be given by using a tensor as one example of the data. The co-occurrence generation unit 130 generates a tensor in such a way as to hold a value indicating a relation of co-occurrence between predicate argument structures.

Note that the information processing device 100 generates another tensor, as will be described later. Thus, a tensor to be generated by the co-occurrence generation unit 130 will be hereinafter referred to as an "original co-occurrence tensor". Note that the number of original co-occurrence tensors to be generated may be one or plural, which will be described later in detail.

The original co-occurrence tensor will be described with reference to the drawings.

The original co-occurrence tensor is a tensor related to a predicate argument structure. Thus, the original co-occurrence tensor has a mode (axis) for a predicate and a mode for an argument of a case set in advance as a processing target.

Figures 2, 3:
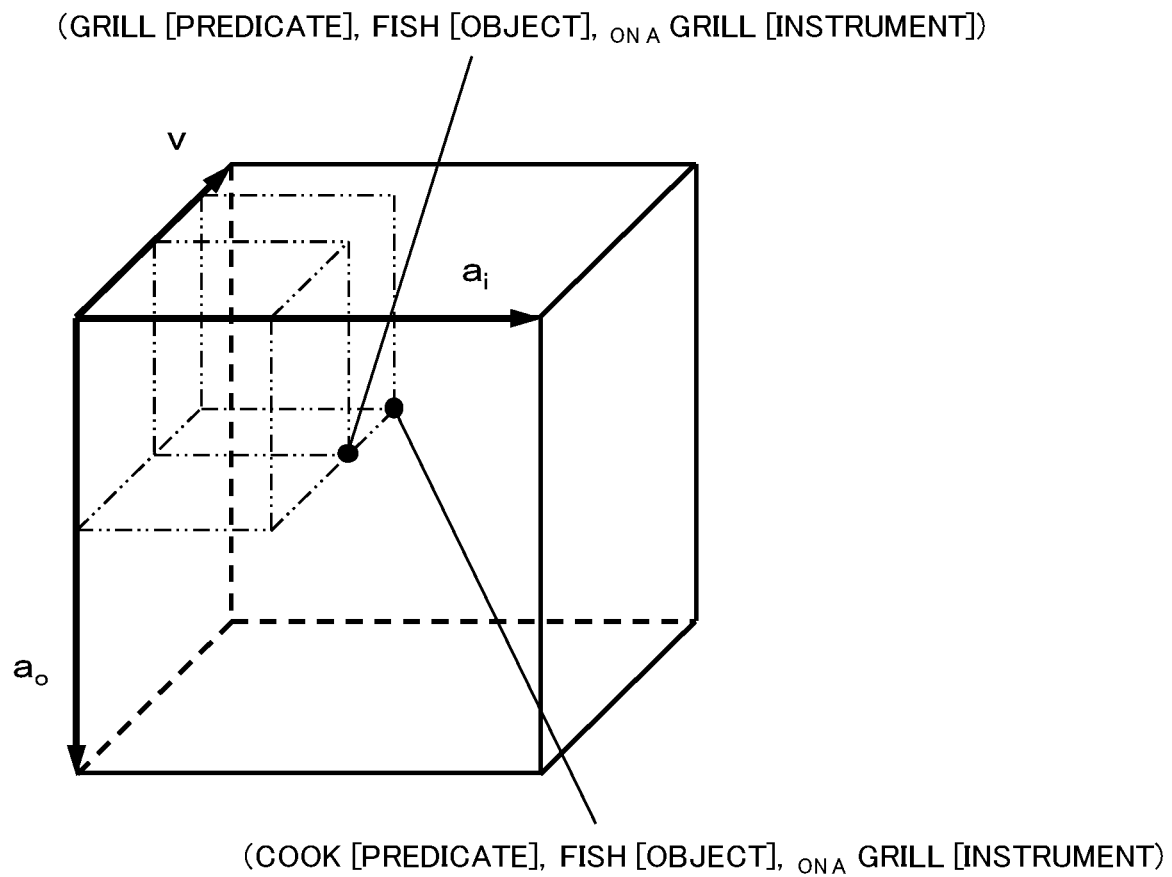
FIG. 2 is a diagram illustrating one example of a pair of predicate argument structures.
FIG. 3 is a diagram illustrating one example of an original co-occurrence tensor.

FIG. 2 is a diagram illustrating one example of a pair of predicate argument structures. In FIG. 2, parentheses indicate each predicate argument structure. A leftmost element within parentheses is a predicate. Other arguments are arguments related to cases. Square brackets indicate a type (a predicate or a case) of an element within a predicate argument structure. A predicate argument structure in front of (in FIG. 2, above) an arrow is an antecedent. A predicate argument structure behind (in FIG. 2, below) the arrow is a consequent.

FIG. 2 illustrates an implication relation in a pair of predicate argument structures: "When the predicate argument structure (grill [predicate], fish [object], on a grill [instrument]) is true, then the predicate argument structure (cook [predicate], fish [object], on a grill [instrument]) is true".

FIG. 3 is a diagram schematically illustrating one example of an original co-occurrence tensor including the predicate argument structures illustrated in FIG. 2. The original co-occurrence tensor illustrated in FIG. 3 is one example of a tensor including a predicate and all arguments. Specifically, the original co-occurrence tensor illustrated in FIG. 3 includes three modes: a mode (v) for a predicate, a mode ($a_i$) for an instrumental argument, and a mode ($a_o$) for an objective argument.

Figure 4:
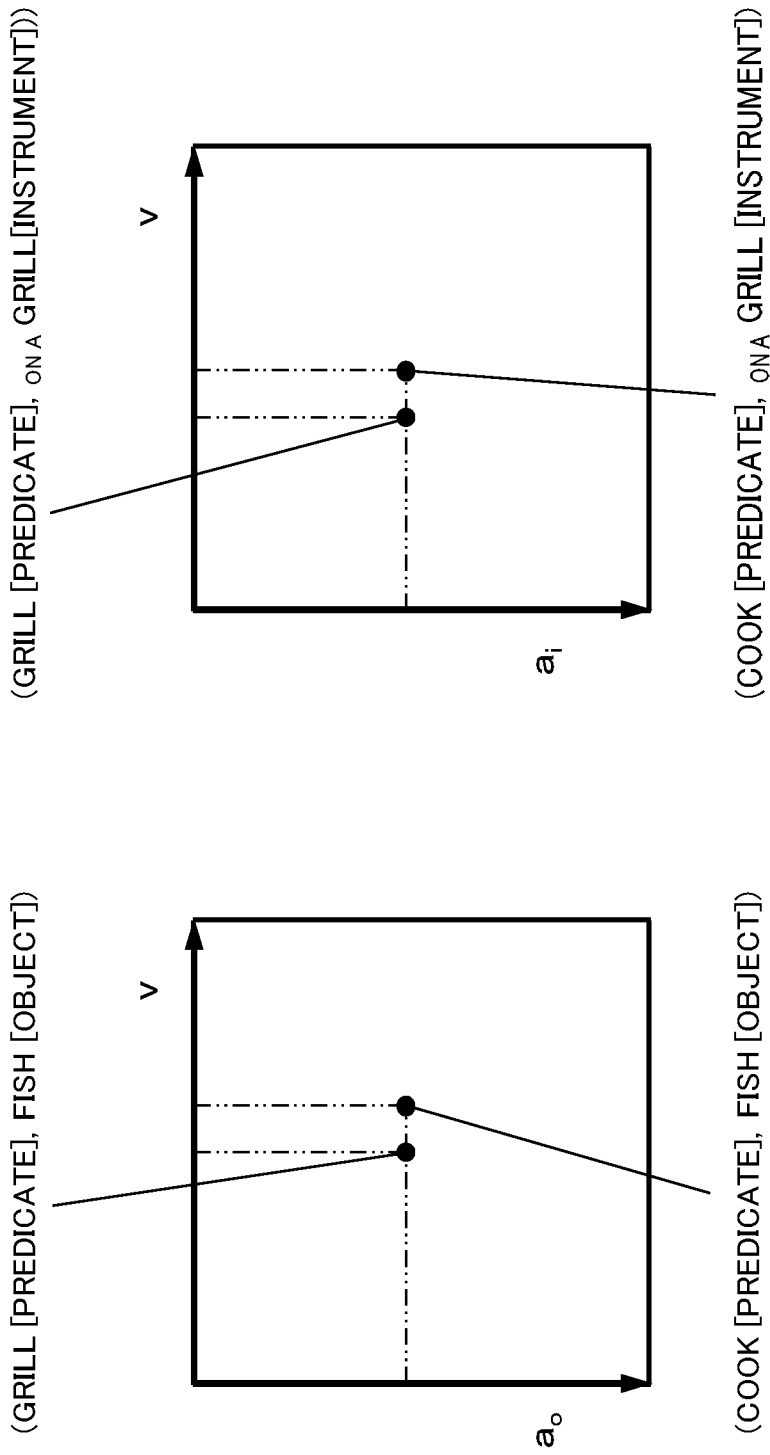
FIG. 4 is a diagram illustrating one example of another original co-occurrence tensor.

FIG. 4 is a diagram illustrating one example of another original co-occurrence tensor including the predicate argument structures illustrated in FIG. 2. The original co-occurrence tensors illustrated in FIG. 4 are tensors each including a predicate and one case. In this case, each original co-occurrence tensor includes two modes. Thus, a format of data of the original co-occurrence tensor is a matrix. The left-side tensor in FIG. 4 is a tensor (matrix) including the modes for a predicate (v) and an objective argument ($a_o$). Further, the right-side tensor in FIG. 4 is a tensor (matrix) including the modes for a predicate (v) and an instrument ($a_i$).

The co-occurrence generation unit 130 may generate an original co-occurrence tensor including all predicate argument structures as illustrated in FIG. 3.

Alternatively, the co-occurrence generation unit 130 may generate an original co-occurrence tensor including a predicate and some arguments as illustrated in FIG. 4. However, in this case, the co-occurrence generation unit 130 generates a plurality of original co-occurrence tensors in such a way as to include all arguments.

Description will be given again with reference to FIG. 1.

The potential generation unit 140 decomposes, in order to generate data (third data) including potential co-occurrence, the original co-occurrence tensor (first data) into pieces of predetermined data (second data), and generates, on the basis of the decomposed data, data (third data) including potential co-occurrence.

Specifically, the potential generation unit 140 generates, on the basis of the original co-occurrence tensor, a tensor including potential co-occurrence. More specifically, the potential generation unit 140 decomposes the original co-occurrence tensor into tensors of lower rank (order) than the original co-occurrence tensor, and generates a tensor being a product of the decomposed tensors. The generated tensor is approximation of the original co-occurrence tensor when a predetermined decomposition approach is used.

Hereinafter, a tensor acquired by decomposing an original co-occurrence tensor (a tensor of lower rank than an original co-occurrence tensor) will be referred to as a "factor tensor".

In addition, a tensor being a product of factor tensors will be referred to as a restore tensor. The restore tensor is approximation of the original co-occurrence tensor, and is a tensor of the same mode as the original co-occurrence tensor.

Note that the factor tensor has lower rank than the original co-occurrence tensor. Thus, the number of elements included in the factor tensor is smaller than the number of elements included in the original co-occurrence tensor.

The original co-occurrence tensor, the factor tensor, and the restore tensor are one example of the first data, the second data, and the third data, respectively.

The factor tensor and the restore tensor will be described with reference to the drawings.

FIG. 5 is a diagram illustrating one example of an original co-occurrence tensor X used for description of the potential generation unit 140. The original co-occurrence tensor X illustrated in FIG. 5 is a tensor including predicates (v) and objective arguments ($a_o$). The original co-occurrence tensor X in FIG. 5 is a matrix because there are two modes.

Note that, in the drawings including FIG. 5, a blank column is a column having a value equal to zero, or having a value of which absolute value is sufficiently small (for example, equal to or less than $10^{-10}$). Hereinafter, a blank column in the drawings indicates a column having a value of zero, or having a value of which absolute value is smaller than a predetermined value, as described above.

Further, a numerical value in the drawings has three significant digits.

The potential generation unit 140 decomposes an original co-occurrence tensor into factor tensors. Then, the potential generation unit 140 generates a restore tensor as a product of the factor tensors.

An approach used by the potential generation unit 140 for decomposition of a tensor is determined on the basis of a tensor to be treated. More specifically, as the method, an appropriate method is determined on the basis of rank of an original co-occurrence tensor, allowable approximation accuracy (magnitude of a difference between an original co-occurrence tensor and a restore tensor), processing time, and the like, with reference to past knowledge and the like. For example, the potential generation unit 140 may use non-negative matrix factorization being one type of tensor (matrix) decomposition approaches.

Alternatively, the potential generation unit 140 may acquire the factor tensor and the restore tensor as a solution of an optimization problem as follows.
Optimization problem: To minimize a difference between an original co-occurrence tensor and a restore tensor (the difference is also referred to as a "distance").
Constraint: The factor tensor is a non-negative tensor (a tensor having all components equal to or more than zero).

Various approaches are proposed as an approach to solve the optimization problem as described above. In view of this, an approach used by the potential generation unit 140 may be selected according to a specific optimization problem.

Figure 6:
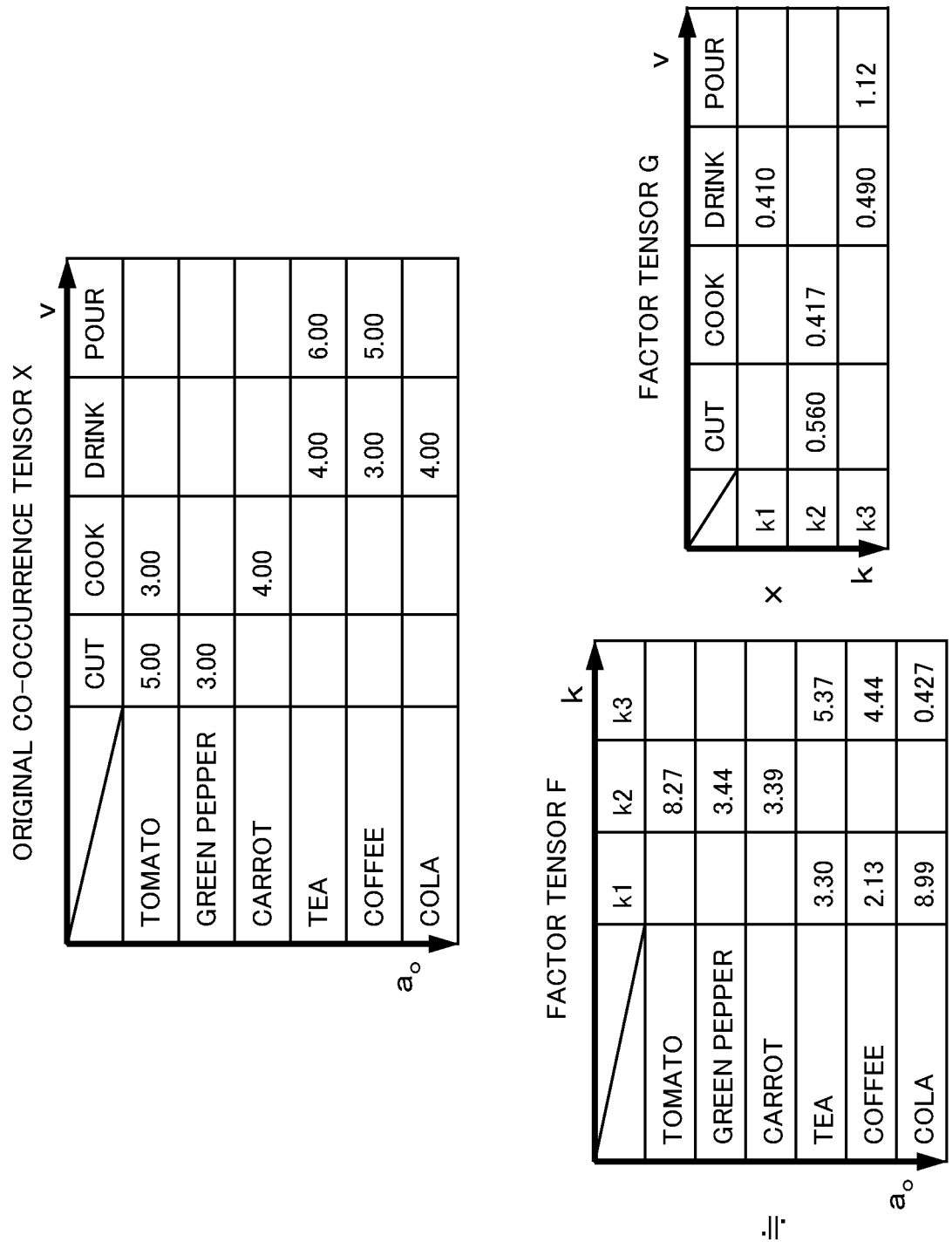
FIG. 6 is a diagram illustrating one example of a factor tensor.

FIG. 6 is a diagram illustrating one example of the factor tensor. In FIG. 6, the original co-occurrence tensor X including a mode for the predicates (v) and a mode for the objective arguments ($a_o$) are decomposed into factor tensors F and G. The factor tensor F is a tensor including the objective arguments ($a_o$) and a mode (hereinafter, referred to as "mode k") introduced for matrix factorization. The factor tensor G is a tensor including the mode for the predicates (v) and the mode k.

Note that the mode k in the factor tensors F and G is equivalent to an abstract concept represented on the basis of co-occurrence of a predicate and an argument. In view of this, the mode k is called a "potential meaning".

For example, in FIG. 6, potential meaning k1 has a value relatively larger in a predicate "drink" and in arguments "tea", "coffee", and "cola", than in other components. Thus, as a potential meaning of mode k1, a concept retrieved on the basis of a set of the above-described predicate and arguments, for example, a potential meaning "to execute an action of drinking some kind of beverage", can be expected.

Then, a product of the factor tensors F and G is a restore tensor.

Figure 7:
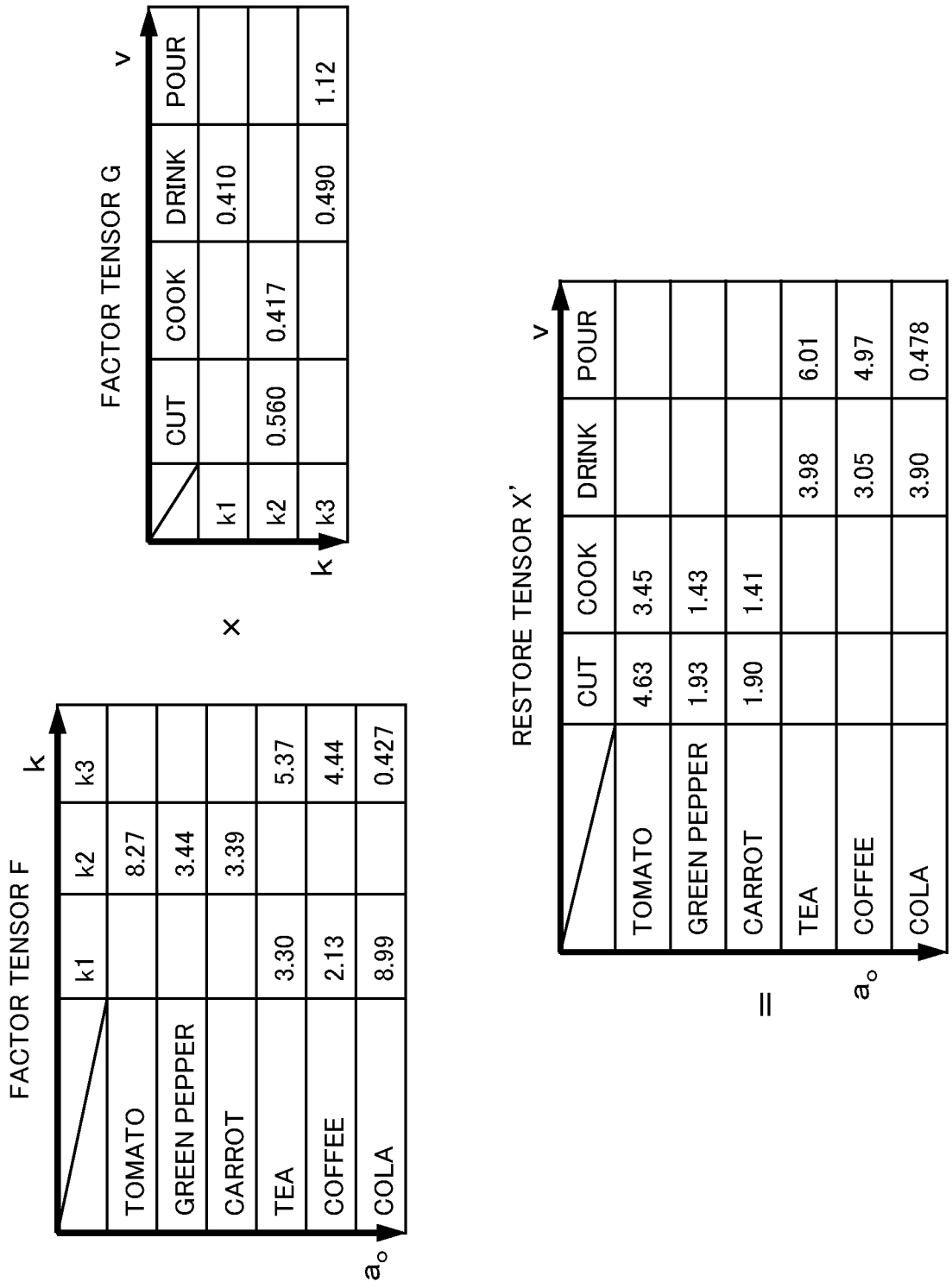
FIG. 7 is a diagram illustrating a restore tensor being a product of factor tensors in FIG. 6.

FIG. 7 is a diagram illustrating the restore tensor X' being a product of the factor tensors F and G in FIG. 6.

Figure 8:
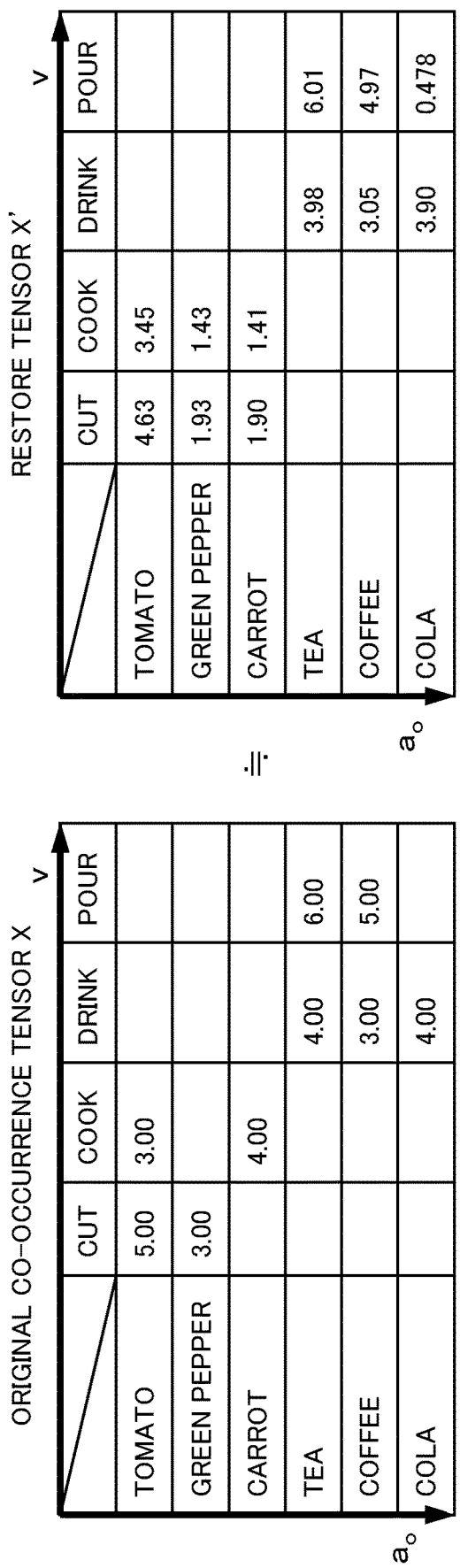
FIG. 8 is a diagram illustrating an original co-occurrence tensor and a restore tensor.

FIG. 8 is a diagram illustrating the original co-occurrence tensor X and the restore tensor X' side by side for comparison.

With reference to FIG. 8, among components (predicate argument structures) being blank columns in the original co-occurrence tensor X, there is a component having a value in the restore tensor. For example, a predicate argument structure (cut [predicate], a carrot [object]) is a blank column in the original co-occurrence tensor X. Meanwhile, a predicate argument structure (cut [predicate], a carrot [object]) has a value of "1.90" in the restore tensor X'.

According to the present example embodiment, a difference between a restore tensor and an original co-occurrence tensor is regarded as estimation for potential co-occurrence of a predicate and an argument in a predicate argument structure potentially existing in the original co-occurrence tensor.

For example, the present example embodiment may use, as complementation of co-occurrence (potential co-occurrence) having not been observed in language data, a value for a predicate and an argument in a predicate argument structure that is a blank column in the original co-occurrence tensor X and that has a non-negative value in the restore tensor X'.

Alternatively, the present example embodiment may use, as complementation of co-occurrence having not been observed in language data, a difference (distance) between values of a predicate argument structure that has a value in a restore tensor greater by a predetermined value than a value in an original co-occurrence tensor.

As described above, a predicate argument structure including complemented co-occurrence is a predicate argument structure being potential co-occurrence.

Note that, when a predicate argument structure includes a plurality of arguments, some of the arguments may include complemented potential co-occurrence. In this case, the argument is potential co-occurrence for a predicate.

Description will be given again with reference to FIG. 1.

The score calculation unit 150 calculates a score for a pair of predicate argument structures by using a predicate argument structure being potential co-occurrence.

For example, the score calculation unit 150 may select, as a pair of predicate argument structures for calculating a score, a pair of predicate argument structures including a predicate argument structure that is a blank column in an original co-occurrence tensor and that is not a blank column in a restore tensor, as a pair of predicate argument structures for calculating a score.

Alternatively, the score calculation unit 150 may select, as a pair of predicate argument structures for calculating a score, a pair of predicate argument structures in which at least one argument included in either one of the predicate argument structures included in the pair is potential co-occurrence.

Alternatively, the score calculation unit 150 may select a pair of predicate argument structures in which, in respective arguments in both of the predicate argument structures included in the pair, at least one argument is potential co-occurrence.

For example, the score calculation unit 150 selects a predicate argument structure that is a blank column in the original co-occurrence tensor X illustrated in FIG. 8 and that includes a value in the restore tensor X'. Specifically, for example, the score calculation unit 150 selects a predicate argument structure (cook [predicate], a green pepper [object]).

Then, the score calculation unit 150 selects a pair of predicate argument structures including the predicate argument structure. For example, the score calculation unit 150 selects a predicate argument structure including the same argument as the first selected predicate argument structure, and makes a pair of predicate argument structures. For example, in the case above, the score calculation unit 150 selects a predicate argument structure (cut [predicate], a green pepper [object]) including the same object (a green pepper [object]) as the predicate argument structure (cook [predicate], a green pepper [object]), and makes a pair of predicate argument structures. In this case, a pair of predicate argument structures is "(cut [predicate], a green pepper [object])→(cook [predicate], a green pepper [object])". Note that the score calculation unit 150 may select a predicate argument structure in which an antecedent and a consequent are switched.

The score calculation unit 150 may use any method of selecting a pair of predicate argument structures. For example, the score calculation unit 150 may select, from among pairs of predicate argument structures sharing an identical argument, a pair having values of both components in a restore tensor equal to or greater than a predetermined threshold value. Herein, a pair of predicate argument structures sharing an identical argument is a pair of predicate argument structures in which one predicate argument structure is (V1 [predicate], A1 [first case], A2 [second case], ... ) and another predicate argument is (V2 [predicate], A1 [first case], A2 [second case], ... ). Note that the score calculation unit 150 may select not only a pair of predicate argument structures sharing all arguments, but also a pair of predicate argument structures sharing some arguments.

Then, the score calculation unit 150 calculates a score for a pair of predicate argument structures on the basis of the restore tensor. The score calculation unit 150 may use, in calculation of a score, the original co-occurrence tensor in addition to the restore tensor. Alternatively, the score calculation unit 150 may use the original co-occurrence tensor instead of the restore tensor.

The pair selection unit 160 selects a pair of predicate argument structures having a score satisfying a predetermined condition. For example, the pair selection unit 160 may select a pair of predicate argument structures having a score equal to or greater than a threshold value. Alternatively, the pair selection unit 160 may select a predetermined number of pairs of predicate argument structures in descending order of score values.

In addition, the pair selection unit 160 may output a selected pair of predicate argument structures to a predetermined output destination. For example, the pair selection unit 160 may output a selected pair of predicate argument structures to an unillustrated external device. Alternatively, the pair selection unit 160 may store a pair of predicate argument structures in an unillustrated storage unit. Alternatively, the pair selection unit 160 may output a pair of predicate argument structures to an unillustrated configuration of the information processing device 100. Alternatively, the pair selection unit 160 may transmit a pair of predicate argument structures to a transmission source of language data.

[Description of Operation]

Next, an operation of the information processing device 100 according to the first example embodiment will be described with reference to the drawings.

Figure 9:
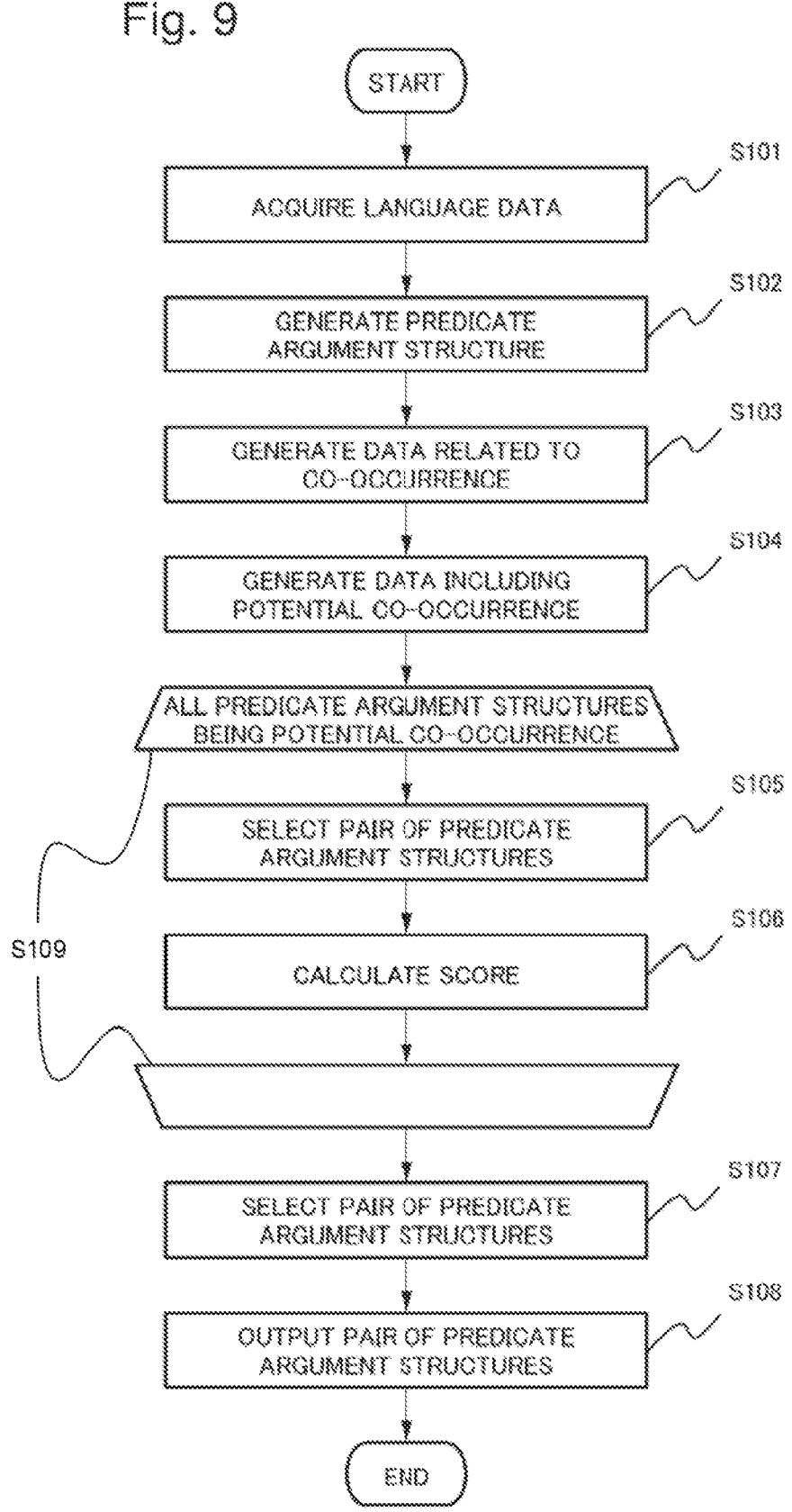
FIG. 9 is a flowchart illustrating one example of an operation of the information processing device according to the first example embodiment.

FIG. 9 is a flowchart illustrating one example of the operation of the information processing device 100 according to the first example embodiment.

First, the structure generation unit 120 acquires language data to be processed (Step S101).

Then, the structure generation unit 120 generates a predicate argument structure in the language data (Step S102).

The co-occurrence generation unit 130 generates, on the basis of the language data and the predicate argument structure, data (an original co-occurrence tensor) related to co-occurrence between a predicate and an argument (Step S103).

The potential generation unit 140 generates, on the basis of the original co-occurrence tensor, data (a restore tensor) including potential co-occurrence (Step S104). Specifically, the potential generation unit 140 generates data (factor tensors) of lower rank than the original co-occurrence tensor by decomposing the original co-occurrence tensor. Then, the potential generation unit 140 generates data (the restore tensor) being a product of the factor tensors.

The score calculation unit 150 performs a process contained within element S109 in a loop for all predicate argument structures being potential co-occurrence. For example, the score calculation unit 150 calculates a score for a pair of predicate argument structures.

Specifically, first, the score calculation unit 150 selects a predicate argument structure for calculating a score (Step S105).

Then, the score calculation unit 150 calculates a score for a pair of predicate argument structures including the predicate argument structure selected on the basis of the restore tensor (Step S106).

The score calculation unit 150 repeats the above-described operation for all predicate argument structures being potential co-occurrence.

The pair selection unit 160 selects a pair of predicate argument structures having a score satisfying a predetermined condition (Step S107).

The pair selection unit 160 outputs the selected pair of predicate argument structures to a predetermined output destination (Step S108).

Description of Advantageous Effect

Next, an advantageous effect of the first example embodiment will be described.

The information processing device 100 according to the first example embodiment exhibits an advantageous effect of selecting a pair of predicate argument structures being in a relation of potential co-occurrence in language data to be processed.

The reason is as follows.

The structure generation unit 120 generates, on the basis of language data, a predicate argument structure including a predicate and an argument being an object of the predicate. Then, the co-occurrence generation unit 130 generates first data (an original co-occurrence tensor) indicating co-occurrence of the predicate and the argument in the predicate argument structure. Then, the potential generation unit 140 decomposes the first data (the original co-occurrence tensor) into a plurality of pieces of second data (factor tensors) including fewer elements than elements included in the first data (the original co-occurrence tensor). Then, the potential generation unit 140 generates, on the basis of the second data (the factor tensors), third data (a restore tensor) including potential co-occurrence of the predicate and the argument. Then, the score calculation unit 150 selects the predicate argument structure by using the first data (the original co-occurrence tensor) and the third data (the restore tensor), and calculates, by using the third data (the restore tensor), a score for a pair of the selected predicate argument structures. Then, the pair selection unit 160 selects the pair of the predicate argument structures on the basis of the score.

More specifically, the structure generation unit 120 generates a predicate argument structure indicating a structure of target configurations (a predicate and an argument) of co-occurrence in language data.

Then, the co-occurrence generation unit 130 generates an original co-occurrence tensor including information relating to co-occurrence in the generated predicate argument structure.

Then, the potential generation unit 140 decomposes the original co-occurrence tensor into factor tensors of lower rank, and generates a restore tensor being a product of the factor tensors. In the present example embodiment, a difference between a restore tensor and an original co-occurrence tensor is related to potential co-occurrence of a predicate and an argument in a predicate argument structure.

Then, the score calculation unit 150 calculates a score for a pair of predicate argument structures including a predicate argument structure related to potential co-occurrence. This score indicates a degree of implication relation in potential co-occurrence. In other words, a pair of predicate argument structures of which this score is high potentially exists in language data, and may be co-occurrence with high possibility.

Then, the pair selection unit 160 selects a pair of predicate argument structures on the basis of the score.

As described above, the information processing device 100 according to the first example embodiment is able to select a pair of predicate argument structures including a predicate argument structure being potential co-occurrence that is not explicitly included in language data, and is able to calculate a score thereof. This score becomes a high value for a pair of predicate argument structures being in a potential co-occurrence relation. Thus, the information processing device 100 according to the first example embodiment is able to select a pair of predicate argument structures being in a potential co-occurrence relation included in language data.

A pair of predicate argument structures selected herein is, for example, a candidate for implication relation knowledge.

Second Example Embodiment

Next, a case of using an original co-occurrence tensor including all arguments will be described as a second example embodiment. Note that, when there is one argument, an operation according to the second example embodiment is the same as the first example embodiment and a third example embodiment to be described next. Thus, in the description of the present example embodiment, it is assumed that there are a plurality of arguments. However, this is not intended to exclude a case where there is one argument according to the second example embodiment.

[Description of Configuration]

A configuration of an information processing device 101 according to the second example embodiment will be described with reference to the drawings.

Figure 10:
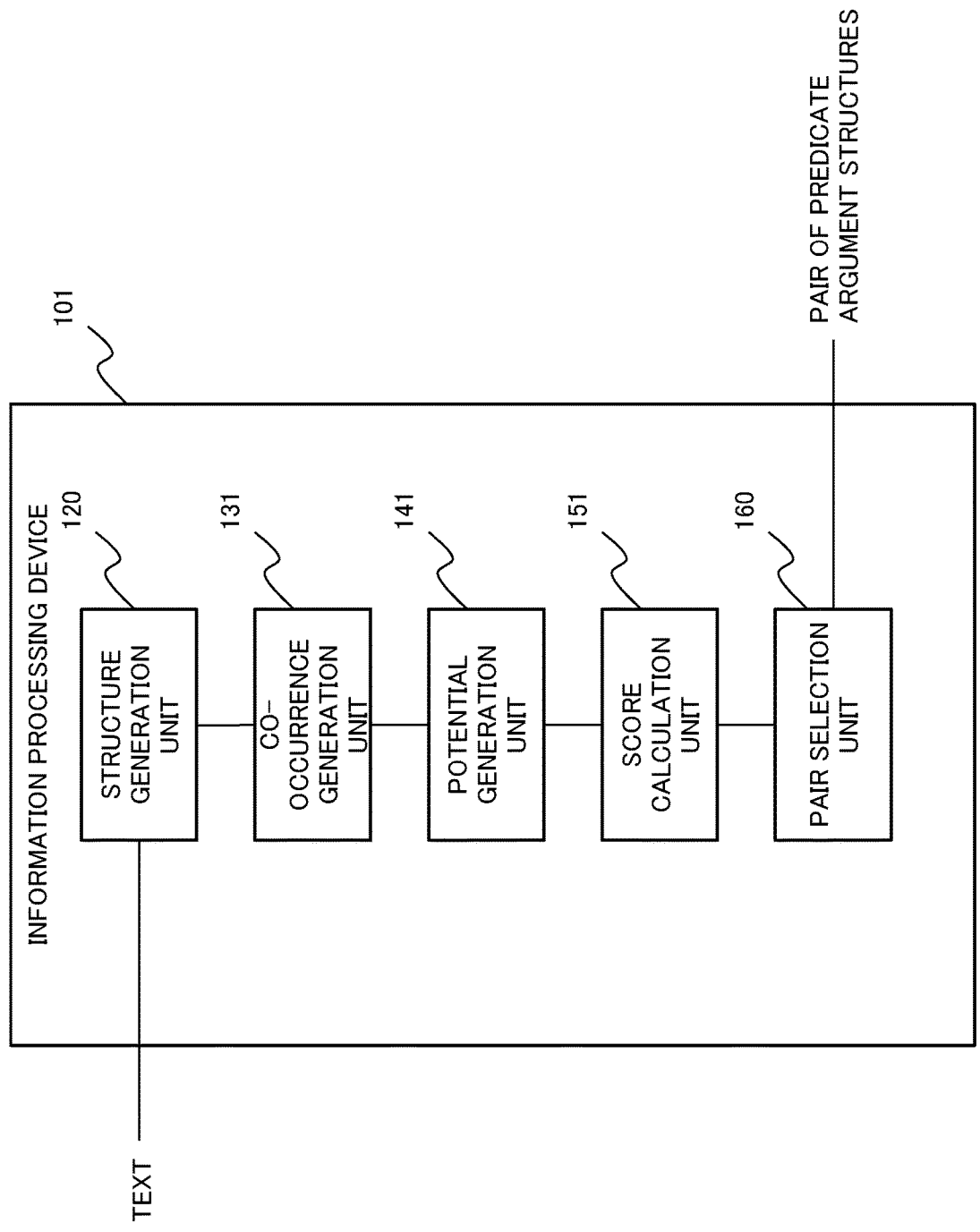
FIG. 10 is a block diagram illustrating one example of a configuration of an information processing device according to a second example embodiment.

FIG. 10 is a block diagram illustrating one example of the configuration of the information processing device 101 according to the second example embodiment. When compared with the information processing device 100 according to the first example embodiment, the information processing device 101 is different in that the information processing device 101 includes a co-occurrence generation unit 131, a potential generation unit 141, and a score calculation unit 151, instead of the co-occurrence generation unit 130, the potential generation unit 140, and the score calculation unit 150.

The co-occurrence generation unit 131, the potential generation unit 141, and the score calculation unit 151 operate similarly to the co-occurrence generation unit 130, the potential generation unit 140, and the score calculation unit 150, except that an original co-occurrence tensor to be treated is a tensor including all arguments. Further, other configurations are similar to the first example embodiment.

In view of the above, configurations specific to the second example embodiment will be mainly described, and description of configurations and operations similar to the first example embodiment will be omitted.

The co-occurrence generation unit 131 generates, as an original co-occurrence tensor, one co-occurrence tensor including modes for a predicate and arguments of all cases to be treated, on the basis of a predicate argument structure generated by the structure generation unit 120 and language data. For example, when arguments of cases to be treated are arguments a and b, the co-occurrence generation unit 131 generates a third-order original co-occurrence tensor including three modes for a predicate (v), an argument (a) of a first case, and an argument (b) of a second case.

The potential generation unit 141 decomposes an original co-occurrence tensor into factor tensors of lower rank than the original co-occurrence tensor, and generates a restore tensor being a product of the factor tensors.

Figure 11:
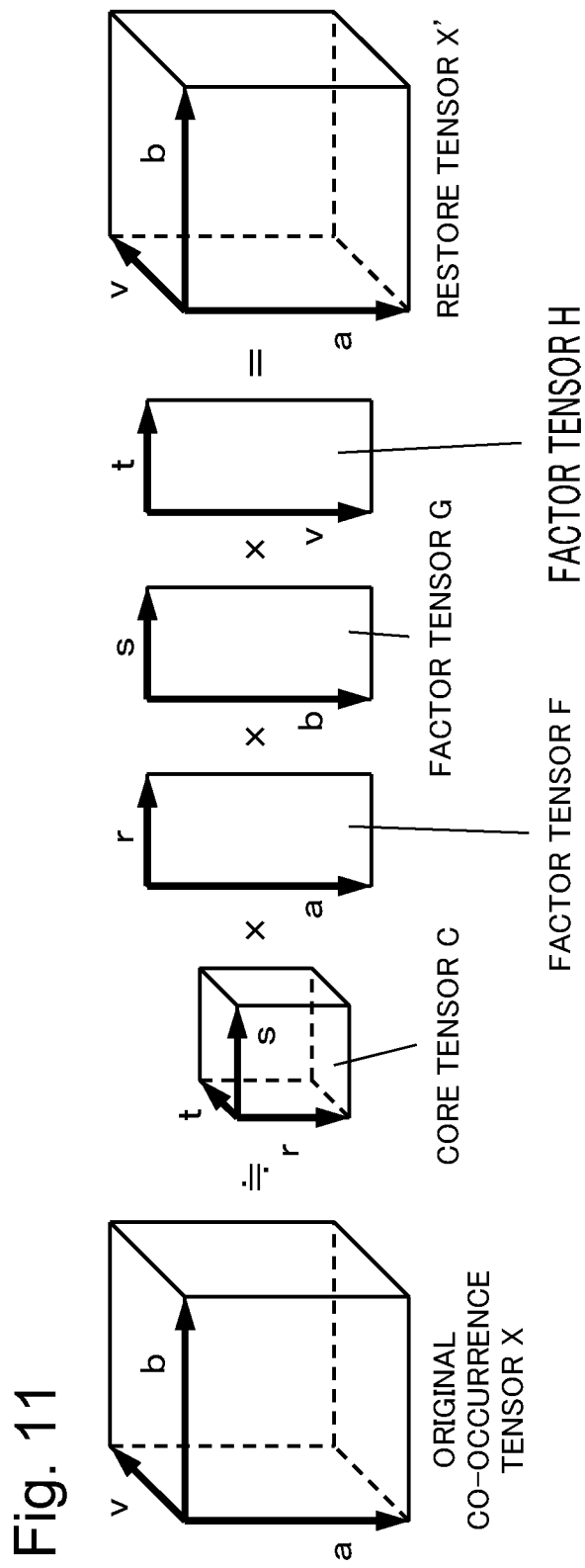
FIG. 11 is a diagram illustrating one example of decomposition and a product of a tensor in the case of a three-order tensor.

FIG. 11 is a diagram illustrating one example of decomposition of a tensor and a product of tensors in the case of a three-order tensor. FIG. 11 is a diagram schematically illustrating Tucker decomposition, which is one example of tensor decomposition. In FIG. 11, lower-case letters indicate respective modes (axes).

The potential generation unit 141 decomposes, by using Tucker decomposition, a third-order original co-occurrence tensor X having modes for predicate v, argument a, and argument b, into a core tensor C and factor tensors F, G, and H related to respective modes of the core tensor C. The core tensor C is a tensor for which modes and sizes of the modes are set in advance.

In addition, the potential generation unit 141 calculates a restore tensor X' as a result of a product of the decomposed core tensor C and the factor tensors F, G, and H. Note that a product between a tensor and a matrix is also called particularly a "mode product". In FIG. 11, the factor tensors F, G, and H are matrices. Thus, a product of tensors in FIG. 11 is also a mode product. However, in the following description, a mode product will not be particularly distinguished, and will be described as a product entirely.

When this relation is represented by using expressions, equation 1 holds as follows.

$$X^{ABV} \approx C^{RST} \times F^{AR} \times G^{BS} \times H^{VT} \times = X'^{ABV}$$ [Equation 1]

In Equation 1, upper-case letters V, A, and B respectively stand for magnitudes (sizes or dimensionalities) of modes v, a, and b which are indicated by using lower-case letters in an original co-occurrence tensor.

The size (dimensionality) is the number of types of related predicates or arguments (for example, the number of predicates). With reference to FIG. 5 for description, size V of the mode v is 4.

English letters R, S, and T stand for sizes (dimensionalities) of modes r, s, and t, which are indicated by using lower-case letters in the core tensor C. The size of the core tensor C is set in advance. In other words, R, S, and T stand for the size set for the modes r, s, and t in advance.

"x" indicates a product of tensors.

The core tensor C is equivalent to a potential meaning. In other words, the modes r, s, and t are equivalent to modes for a potential meaning.

As indicated in equation 1, the restore tensor X' has the same size as the size of the original co-occurrence tensor X.

The score calculation unit 151 selects a pair of predicate argument structures for calculating a score, on the basis of an original co-occurrence tensor and a restore tensor (specifically, on the basis of a difference between an original co-occurrence tensor and a restore tensor).

Then, the score calculation unit 151 calculates a score for a pair of predicate argument structures.

Specifically, the score calculation unit 151 calculates a score as follows.

First, the score calculation unit 151 calculates a probability of appearance for a predicate and an argument on the basis of a value of co-occurrence of the predicate and the argument in a restore tensor.

The probability of appearance is a posterior probability relating to a predicate and an argument. For example, the probability of appearance of an argument is a posterior probability of the argument appearing when a certain predicate appears. Further, the probability of appearance of a predicate is a posterior probability of the predicate appearing when a certain argument appears.

The score calculation unit 151 calculates a score for a pair of predicate argument structures on the basis of the probability of appearance. For example, in detailed example 1 to be described later, a score according to the second example embodiment is a scale acquired by modeling a degree of a consequent predicate argument structure holding when an antecedent predicate argument structure holds. This score indicates a degree of an antecedent predicate argument structure implying a consequent predicate argument structure.

Description of Advantageous Effect

Next, an advantageous effect of the second example embodiment will be described.

The information processing device 101 according to the second example embodiment is able to achieve an advantageous effect similar to the first example embodiment. The reason is that the configurations of the information processing device 101 operate similarly to the configurations of the information processing device 100.

In addition, the information processing device 101 according to the second example embodiment operates by using an original co-occurrence tensor including a predicate and all arguments. In other words, the information processing device 101 uses information including simultaneous and direct co-occurrence of a predicate and all arguments to be considered. Thus, the information processing device 101 is able to more accurately process a pair of relevant predicate argument structures in the case of processing an implication relation about a pair of predicate argument structures including two or more arguments, in comparison with the case of processing arguments individually.

Detailed Example 1

Next, a specific operation example of the information processing device 101 will be described as detailed example 1. In the description of detailed example 1, the information processing device 101 operates for a predicate argument structure including a predicate, an instrumental argument, and a goal argument. However, this is not intended to limit a case in the information processing device 101. The information processing device 101 may operate for an argument of another case, or may operate for a predicate argument structure including an argument of one case or arguments of three or more cases.

First, the structure generation unit 120 generates a predicate argument structure appearing in language data.

For example, it is assumed that the structure generation unit 120 receives text T1 and linguistic analysis information A1 on text T1, as language data indicated below.

T1=A child commutes to school by bicycle.
A1=(predicate=commute, agent=child, goal=school, instrument=bicycle)

Linguistic analysis information A1 is a result of analysis of a predicate argument structure of text T1. Specifically, linguistic analysis information A1 indicates that there is a predicate argument structure composed of a predicate "commute", an agent argument "child", a goal argument "school", and an instrumental argument "bicycle" in text T1. For example, a predicate argument structure of text T1 is "(commute [predicate], child [agent], to school [goal], by bicycle [instrument])".

However, in operation example 1, the information processing device 101 operates for agent and goal arguments. Thus, the structure generation unit 120 generates a predicate argument structure "(commute [predicate], child [agent], to school [goal])" on the basis of text T1 and linguistic analysis information A1.

Next, the co-occurrence generation unit 131 generates an original co-occurrence tensor on the basis of language data and a predicate argument structure. In the following description, it is assumed that this tensor is the original co-occurrence tensor X illustrated in FIG. 11. Specifically, it is assumed that the original co-occurrence tensor X is a third-order tensor having mode v for a predicate, mode a for an agent argument, and mode b for a goal argument. Further, in the following description, equation 1 and variables thereof will be used as appropriate.

The co-occurrence generation unit 131 generates the third-order original co-occurrence tensor X ($X^{ABV}$ in equation 1) having mode v for a predicate, mode a for an agent argument, and mode b for a goal argument.

The co-occurrence generation unit 131 counts frequency of a predicate argument structure generated by the structure generation unit 120 in language data, and sets the frequency for a component of the original co-occurrence tensor X.

For example, when language data include seven predicate argument structures "(commute [predicate], child [agent], to school [goal])", the co-occurrence generation unit 131 sets a value of a component related to the above predicate argument structure in the original co-occurrence tensor X to "7".

Note that the structure generation unit 120 and the co-occurrence generation unit 131 may operate in order, or may operate at least partially in parallel. For example, the co-occurrence generation unit 131 may modify a value of a related component in the original co-occurrence tensor X every time the structure generation unit 120 generates a predicate argument structure from language data.

Subsequently, the potential generation unit 141 generates factor tensors by applying tensor decomposition to the original co-occurrence tensor X, and further generates a restore tensor. In the following description, the potential generation unit 141 uses Tucker decomposition as one example of tensor decomposition. However, the potential generation unit 141 may use another tensor decomposition approach.

When Tucker decomposition is used, dimensionalities R, S, and T of the factor tensors are values set in advance. The potential generation unit 141 generates the core tensor C and the factor tensors F, G, and H by using the original co-occurrence tensor X and the dimensionalities R, S, and T of the factor tensors. Then, the potential generation unit 141 generates the restore tensor X' ($X'^{ABV}$) being a product of the core tensor C and the factor tensors F, G, and H, as indicated in equation 1.

Note that a problem of acquiring the restore tensor X' can be formulated as an optimization problem. In view of this, the above processing of the potential generation unit 141 can be formulated as an optimization problem of acquiring the factor tensors C, F, G, and H that minimize distance D(X, X') between the original co-occurrence tensor X and the restore tensor X', as indicated in expression 2 below.

$$\underset{C,F,G,H}{\mathrm{argmin}} D(X, X') \qquad \text{[Expression 2]}$$

In expression 2, "argmin" is to acquire the core tensor C and the factor tensors F, G, and G that minimize function D(X, X'). Function D(X, X') is a function of outputting a distance (difference) between the original co-occurrence tensor X and the restore tensor X'.

Any distance may be used. For example, the potential generation unit 141 may use, as a distance, a distance ($D_{EU}$) based on a Euclidean distance ($d_{EU}$) between related elements in the original co-occurrence tensor X and the restore tensor X'.

Alternatively, the potential generation unit 141 may use, as a distance, a distance utilizing generalized Kullback-Leibler divergence. A distance ($D_{EU}(X-X')$) in this case is equation 3 below.

$$D_{EU}(X - X') = \qquad \text{[Equation 3]}$$
$$\sum_{v,a,b} d_{EU}(x_{v,a,b}, x'_{v,a,b}) = \sum_{v,a,b} \frac{\{(x_{v,a,b} - x'_{v,a,b})^2\}}{2}$$

In equation 3, $x_{v,a,b}$ is [v, a, b] component in the original co-occurrence tensor X. $x'_{v,a,b}$ is [v, a, b] component in the restore tensor X'. Hereinafter, square brackets ([ ]) will be used also in the case of indicating a component of a tensor and a matrix. $d_{EU}(x_{v,a,b}, x'_{v,a,b})$ indicates a distance between elements, and is, specifically, $\{(x_{v,a,b}-x'_{v,a,b})^2\}/2$ on the left side.

Next, the score calculation unit 151 calculates a score for a pair of predicate argument structures according to a procedure indicated below.

The score calculation unit 151 selects a pair of predicate argument structures for calculating a score, on the basis of a predetermined condition.

For example, the score calculation unit 151 may select a pair of predicate argument structures in which both values of two components (for example, X'[v1, a, b] and X'[v2, a, b]) in the pair of predicate argument structures both are non-negative.

Alternatively, the score calculation unit 151 may set a threshold value for frequency of co-occurrence, and may calculate a score when both frequencies of two components in a pair of predicate argument structures are equal to or greater than the threshold value.

Alternatively, the score calculation unit 151 may use a pair of predicate argument structures in which a value of component in the co-occurrence tensor X is 0 but a value of component in the restore tensor X' is a non-negative value. In this case, the score calculation unit 151 can calculate a score for a pair of predicate argument structures in which potential co-occurrence is estimated.

Note that the score calculation unit 151 may generate a predicate argument structure including a set of arguments (a cluster of arguments) being a collection of similar arguments, and may calculate a score for a pair of generated predicate argument structures. A predicate argument structure in this case is, for example, (go [predicate], {child, student, pupil, ... } [agent]), or (go [predicate], {to school, to elementary school, ... } [goal]).

In the following description, description will be given by using a pair of predicate argument structures "(e1, e2)=((v1, a, b), (v2, a, b))" as a pair of predicate argument structures to be treated. e1 and e2 indicate predicate argument structures. For example, predicate argument structure e1 is a predicate argument structure (v1, a, b).

Further, the score calculation unit 151 uses, as a score, a score ($score_{SLSA}$) indicated in equation 4 indicated below.

$$score_{SLSA}(v1,v2;a,b) = p(v2|a,b) \times p(a,b|v1) \qquad \text{[Equation 4]}$$

Herein, p(v|a, b) is a posterior probability of predicate v appearing under appearance of arguments a and b. Further, p(a, b|v) is a posterior probability of arguments a and b appearing under appearance of predicate v. The score $score_{SLSA}$ is a score acquired by modeling a degree of a predicate (v2) of predicate argument structure e2 holding under holding of a predicate (v1) of predicate argument structure e1 when arguments a and b are shared by a pair of predicates (v1, v2) of predicate argument structures e1 and e2. The score $score_{SLSA}$ indicates a degree of predicate argument structure e1 implying predicate argument structure e2.

Hereinafter, a procedure of calculating a score for a pair of predicate argument structures will be described in detail.

First, the score calculation unit 151 calculates a probability of appearance of a predicate and an argument in the restore tensor X' generated by the potential generation unit 141.

Specifically, the score calculation unit 151 calculates, as a probability of appearance, a posterior probability (equation 5) of a predicate and a posterior probability (equation 6) of an argument.

$$p(v|a,b) = \frac{X'[v,a,b]}{\sum_v X'[v,a,b]} \quad \text{[Equation 5]}$$

$$p(a,b|v) = \frac{X'[v,a,b]}{\sum_{a,b} X'[v,a,b]} \quad \text{[Equation 6]}$$

Then, the score calculation unit 151 calculates the score $score_{SLSA}$ described above, by using the calculated posterior probabilities.

However, a score for the score calculation unit 151 is not limited to the above. For example, the score calculation unit 151 may acquire a score as a value of a pair of predicates, as in equation 7 below.

$$score_{SLSL}(v1, v2) = \sum_{a,b} score_{SLSL}(v1, v2; a, b) \quad \text{[Equation 7]}$$

The pair selection unit 160 selects, on the basis of a score, a pair of predicate argument structures satisfying a predetermined condition.

Third Example Embodiment

Next, a case where there are a plurality of original co-occurrence tensors will be described as a third example embodiment. In other words, a case where at least some arguments are included in different tensors will be described.

[Description of Configuration]

A configuration of an information processing device 102 according to the third example embodiment will be described with reference to the drawings.

Figure 12:
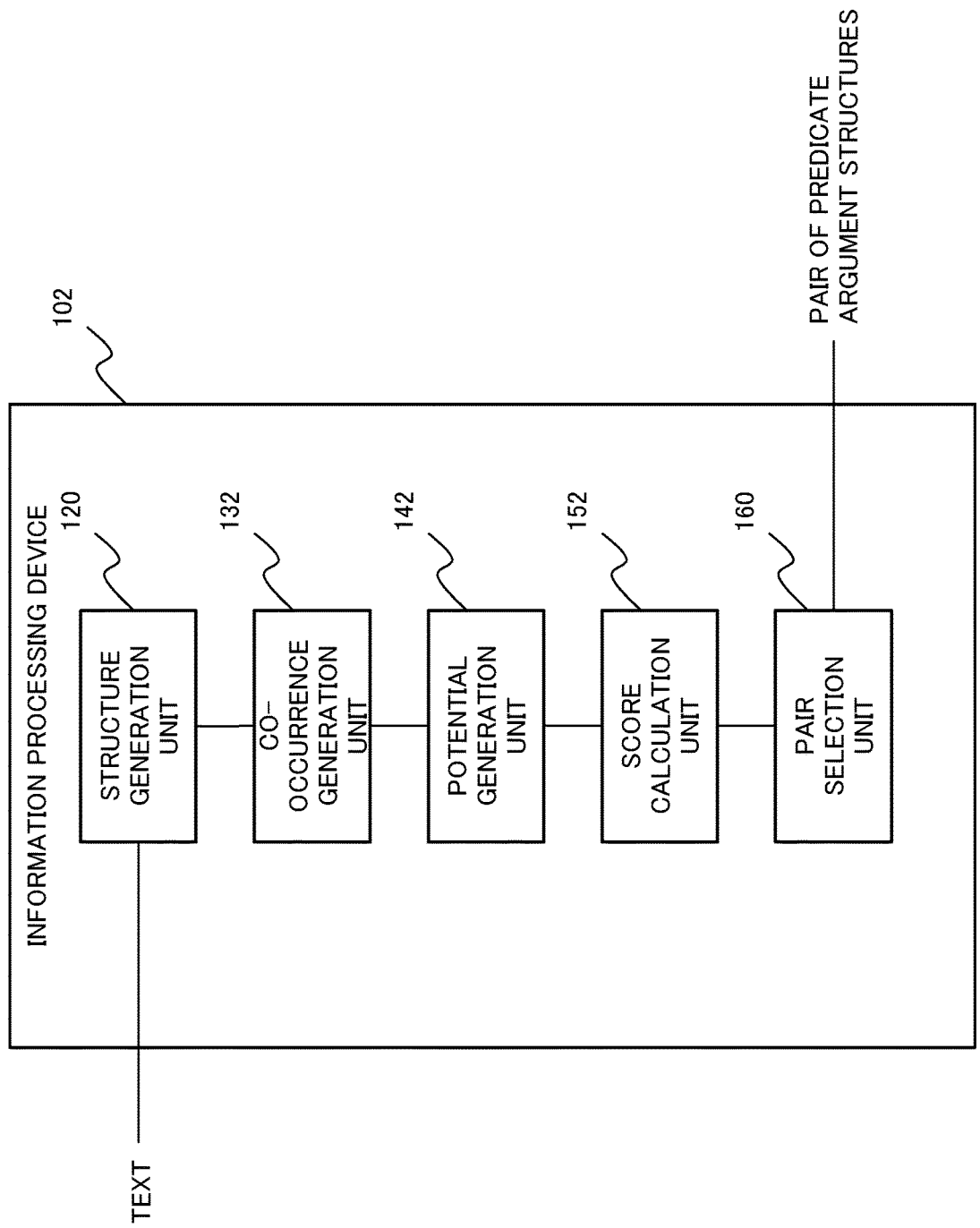
FIG. 12 is a block diagram illustrating one example of a configuration of an information processing device according to a third example embodiment.

FIG. 12 is a block diagram illustrating one example of the configuration of the information processing device 102 according to the third example embodiment. When compared with the information processing device 100 according to the first example embodiment, the information processing device 102 is different in that the information processing device 102 includes a co-occurrence generation unit 132, a potential generation unit 142, and a score calculation unit 152, instead of the co-occurrence generation unit 130, the potential generation unit 140, and the score calculation unit 150.

The co-occurrence generation unit 132, the potential generation unit 142, and the score calculation unit 152 operate similarly to the co-occurrence generation unit 130, the potential generation unit 140, and the score calculation unit 150, except that there are a plurality of original co-occurrence tensors to be treated. Further, other configurations are similar to the first example embodiment.

In view of the above, configurations specific to the third example embodiment will be mainly described, and description of configurations and operations similar to the first example embodiment will be omitted.

The co-occurrence generation unit 132 generates, as an original co-occurrence tensor, original co-occurrence tensors including a predicate and one argument, on the basis of a predicate argument structure generated by the structure generation unit 120 and language data. In other words, the co-occurrence generation unit 132 generates original co-occurrence tensors as many as the number of cases to be treated.

Each original co-occurrence tensor includes a mode for a predicate and a mode for an argument of any one case. In other words, each original co-occurrence tensor is a second-order tensor (matrix). In view of this, according to the following third example embodiment, description will be given by using a matrix instead of a tensor, for clarification of description. For example, an original co-occurrence tensor will be referred to as an original co-occurrence matrix.

Figure 13:
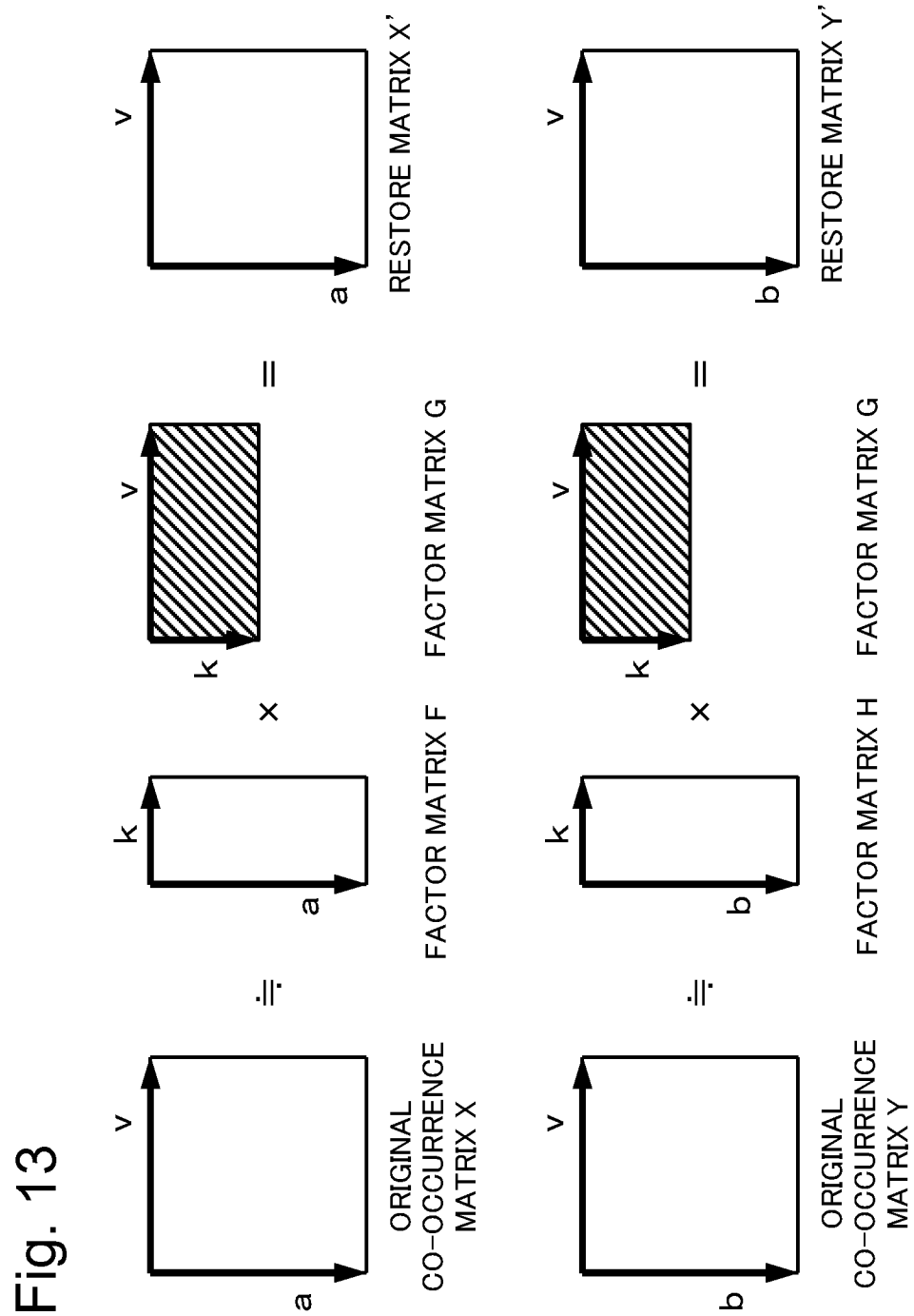
FIG. 13 is a diagram illustrating one example of decomposition and a product of a matrix when there are two cases to be treated.

FIG. 13 is a diagram illustrating one example of decomposition and a product of matrices when there are two cases to be treated. A mode k in FIG. 13 is a potential meaning.

When there are two cases, the co-occurrence generation unit 132 generates a first original co-occurrence matrix (X) related to modes for a predicate (v) and a first argument (a), and a second original co-occurrence matrix (Y) related to modes for the predicate (v) and a second argument (b).

The potential generation unit 142 decomposes a plurality of generated original co-occurrence matrices. Thus, the potential generation unit 142 executes multiple matrix factorization. The multiple matrix factorization is an approach of matrix factorization to decompose a plurality of matrices individually into factor matrices under a constraint that some of the factor matrices are shared. The potential generation unit 142 decomposes the original co-occurrence matrices into factor matrices under a constraint that a factor matrix having a mode for a predicate is shared. Hereinafter, a factor matrix to be shared will be referred to as a shared factor matrix. Further, matrices sharing a shared factor matrix will be also referred to as "matrices having a shared factor matrix".

In FIG. 13, a shared factor matrix is hatched. In other words, a factor matrix G is a shared factor matrix.

Then, the potential generation unit 142 generates restore matrices related to the original co-occurrence matrices.

Processing on the original co-occurrence matrices illustrated in FIG. 13 is indicated as in equation 8 indicated below.

$$X^{AV} \approx F^{AK} \times G^{KV} = X'^{AV}$$

$$Y^{BV} \approx H^{BK} \times G^{KV} = Y'^{BV} \quad \text{[Equation 8]}$$

In equation 8, superscripts are the same as in equation 1. An original co-occurrence matrix X is decomposed into factor matrices F and G. An original co-occurrence matrix Y is decomposed into factor matrices H and G. The original co-occurrence matrices X and Y are matrices having the shared factor matrix G. Then, a result of a product of the matrices F and G is a restore matrix X' being approximation of the original co-occurrence matrix X. A result of a product of the matrices H and G is a restore matrix Y' being approximation of the original co-occurrence matrix Y.

Even when the number of arguments is three or more, the potential generation unit 142 may execute multiple matrix factorization in a similar way under a constraint that a predetermined factor matrix is shared.

The score calculation unit 152 calculates a score for a pair of predicate argument structures on the basis of the original co-occurrence matrices, the factor matrices, and the restore matrices.

More specifically, the score calculation unit 152 operates as follows.

The score calculation unit 152 selects a pair of predicate argument structures for calculating a score, on the basis of a difference between an original co-occurrence matrix and a restore matrix. Then, the score calculation unit 152 calculates a probability of appearance for a predicate and an argument on the basis of frequency of co-occurrence in a predicate argument structure included in the restore matrix. A probability of appearance is similar to the second example embodiment.

Furthermore, the score calculation unit 152 calculates a relationship between arguments of different cases on the basis of the factor matrices. Any relationship may be used.

One example of the relationship will be described with reference to the drawings.

Figure 14:
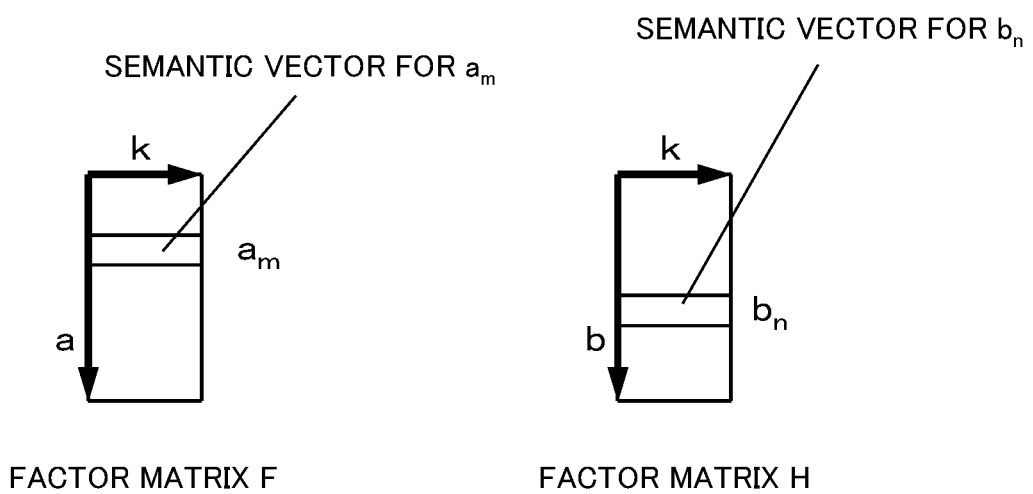
FIG. 14 is a diagram illustrating one example of a vector used for a relationship related to FIG. 13.

FIG. 14 is a diagram illustrating one example of a vector used for the relationship related to FIG. 13. The score calculation unit 152 calculates a relationship between a predetermined argument ($a_m$) of arguments (a) of a first case and a predetermined argument ($b_n$) of arguments (b) of a second case as follows.

A row vector for an argument ($a_m$) being one of the arguments (a) in the factor matrix F is a vector related to a meaning (potential meaning (k)) of the argument ($a_m$). Hereinafter, a vector related to a potential meaning (k) will be referred to as a "semantic vector".

Similarly, a row vector for an argument ($b_n$) being one of the arguments (b) in the factor matrix H is a semantic vector for the argument ($b_n$).

All original co-occurrence matrices are decomposed into a shared factor matrix and factor matrices having the factor matrix. Thus, the number of elements in a semantic vector for an argument is the same number (rank K of the mode k) in all factor matrices. In other words, a semantic vector for an argument ($a_m$) and a semantic vector for an argument ($b_n$) have the same number of arguments.

Then, the score calculation unit 152 uses, as a relationship, an inner product between a semantic vector for an argument ($a_m$) and a semantic vector for an argument ($b_n$).

Even in the case of a relationship among three or more arguments, the score calculation unit 152 may calculate an inner product of semantic vectors for the three or more arguments.

Then, the score calculation unit 152 calculates a score for a pair of predicate argument structures on the basis of the probability of appearance and the relationship. For example, the score calculation unit 152 uses, as a score, a product between a probability of appearance and an inner product.

Description of Advantageous Effect

Next, an advantageous effect of the third example embodiment will be described.

The information processing device 102 according to the third example embodiment is able to achieve an advantageous effect similar to the first example embodiment. The reason is that the configurations of the information processing device 102 operate similarly to the configurations of the information processing device 100.

In addition, the information processing device 102 according to the third example embodiment is able to achieve an advantageous effect as follows.

The information processing device 102 alleviates an issue of rare co-occurrence of a predicate and a plurality of arguments, even in the case of processing an implication relation relevant to two or more arguments. In other words, the information processing device 102 is able to more appropriately determine strength of relation between a predicate and a plurality of arguments.

The reason is as follows.

The co-occurrence generation unit 132 generates original co-occurrence matrices related to arguments of individual cases.

In addition, the potential generation unit 142 uses, in multiple matrix factorization, a constraint that a mode for a potential meaning is shared by factor matrices (a constraint that the same shared factor matrix is used). Thus, the number of elements in a semantic vector for an argument is the same number in all cases. Thus, the score calculation unit 152 is able to calculate a relationship between arguments of different cases, such as an inner product of semantic vectors.

Further, the information processing device 102 generates a pair of predicate argument structures in consideration of shared information (a shared factor matrix) relating to co-occurrence about a predicate and at least some of arguments. Thus, the information processing device 102 is able to treat a case of processing an implication relation relevant to two or more arguments.

Detailed Example 2

Next, a specific operation example of the information processing device 102 will be described as detailed example 2. In detailed example 2, the information processing device 102 operates for a predicate argument structure including a predicate, an agent argument, and a goal argument.

An operation of the structure generation unit 120 is similar to example 1, and thus, detailed description will be omitted.

The co-occurrence generation unit 132 generates two original co-occurrence matrices (see FIG. 13). First original co-occurrence matrix X has a mode (v) for a predicate and a mode (a) for an agent argument ($X^{AV}$). Second original co-occurrence matrix Y has a mode (v) for a predicate and a mode (b) for a goal argument ($Y^{BV}$).

The co-occurrence generation unit 132 counts frequency of a predicate argument structure in language data, and substitutes a count value for a related component of the original co-occurrence matrices X and Y.

For example, when language data include six predicate argument structures (commute [predicate], child [agent], to school [goal]), the co-occurrence generation unit 132 sets 6 for a related component of the original co-occurrence matrices X and Y as follows.

(1) The co-occurrence generation unit 132 sets 6 for a component [commute [predicate], child [agent]] of the original co-occurrence matrix X.

(2) The co-occurrence generation unit 132 sets 6 for a component [commute [predicate], to school [goal]] of the original co-occurrence matrix Y.

Alternatively, when language data include three predicate argument structures (commute [predicate], child [agent]), the co-occurrence generation unit 132 sets 3 for a related component of the original co-occurrence matrix X as follows.

(1) The co-occurrence generation unit 132 sets 3 for a component [commute [predicate], child [agent]] of the original co-occurrence matrix X.

Similarly to detailed example 1, the structure generation unit 120 and the co-occurrence generation unit 132 may operate in order, or may operate in parallel.

Subsequently, the potential generation unit 142 generates factor matrices F to G and restore matrices X' and Y' from the original co-occurrence matrices X and Y, by using decoded matrix factorization.

In detailed example 2, the potential generation unit 142 decomposes each of the original co-occurrence matrices X and Y into two non-negative factor matrices. In other words, the potential generation unit 142 generates non-negative factor matrices F, G, and H. However, dimensionality K of the mode k for a potential meaning shared by the factor matrices is set in the potential generation unit 142 in advance.

Then, the potential generation unit 142 generates the restore matrix X' related to the original co-occurrence matrix X and the restore matrix Y' related to the original co-occurrence matrix Y.

Each of the restore matrices X' and Y' is a product of the factor matrices F, G, and H, as indicated in equation 9 and equation 10 below.

$$X'^{AV} = F^{AK} \times G^{KV} \qquad \text{[Equation 9]}$$

$$Y'^{BV} = H^{BK} \times G^{KV} \qquad \text{[Equation 10]}$$

The above processing of the potential generation unit 142 can be formulated as an optimization problem of acquiring the factor tensors F, G, and H, by minimizing a sum of distances D between the original co-occurrence matrices (X and Y) and the restore matrices (X' and Y'), as indicated in expression 11 below.

$$\operatorname*{argmin}_{F,G,H} D(X, X') + D(Y, Y') \qquad \text{[Expression 11]}$$

In expression 11, "argmin" stands for acquiring the factor tensors F, G, and H that minimize a sum of functions "D(X, X')+D(Y, Y')".

A distance in detailed example 2 is similar to detailed example 1.

Next, the score calculation unit 152 calculates a score for a pair of predicate argument structures according to a procedure indicated below.

In the following description, description will be given by using a pair of predicate argument structures "(e1, e2)=((v1, a, b), (v2, a, b))" as a pair of predicate argument structures.

The score calculation unit 152 uses, as a score, $\text{score}_{CLSA}$ indicated in equation 12.

$$\text{score}_{CLSA}(v1,v2;a,b) = r(a,b) \times \text{score}_{part}(v1,v2;a) \times \text{score}_{part}(v1,v2;b) \qquad \text{[Equation 12]}$$

r(a, b) stands for a relationship (inter-argument relationship) between arguments a and b. $\text{score}_{part}(v1, v2;n)$ is equation 13 indicated below (where argument n is argument a or b).

$$\text{score}_{part}(v1,v2;n) = p(v2|n) \times p(n|v1) \qquad \text{[Equation 13]}$$

Probability p(v|n) is a posterior probability of predicate v appearing under appearance of argument n. Probability p(n|v) is a posterior probability of argument n appearing under appearance of predicate v. $\text{score}_{part}(v1, v2; n)$ is a scale that represents, regarding a pair of predicates (v1 and v2) sharing one argument n, a degree of an implication relation holding from v1 to v2. $\text{score}_{part}(v1, v2; n)$ is a score (a relationship between partial structures) calculated individually for each part (argument) of a pair of predicate argument structures.

The score calculation unit 152 calculates a score $\text{score}_{CLSA}$ for a pair of predicate argument structures on the basis of a score ($\text{score}_{part}$) between partial structures of the pair of predicate argument structures and an inter-argument relationship (r(a, b)).

Note that a method of calculating a score for a pair of predicate argument structures is not limited to the above, and may be another method as far as the method uses a score relating to an inter-argument relationship for a pair of predicate argument structures and a score between partial structures related to arguments. For example, the score calculation unit 152 may use a score ($\text{score}_{CLSA}(v1, v2; a, b)$) acquired by multiplying an inter-argument relationship by a minimum value of scores for partial structures of a pair of predicate argument structures, as in equation 14 indicated below.

$$\text{score}_{CLSA}(v1,v2;a,b) = r(a,b) \times \min_{n \in \{a,b\}} \{\text{score}_{part}(v1,v2;n)\} \qquad \text{[Equation 14]}$$

One example of an inter-argument relationship will be described. First, the score calculation unit 152 calculates a probability of appearance of a predicate and an argument in the restore matrices X' and Y' generated by the potential generation unit 142. Specifically, the score calculation unit 152 calculates posterior probabilities p(v|n) and p(n|v) (where argument n is argument a or b) by using [Equation 15] and [Equation 16] below.

$$p(v|n) = \frac{Z'[v,n]}{\sum_v Z'[v,n]} \qquad \text{[Equation 15]}$$

$$p(n|v) = \frac{Z'[v,n]}{\sum_n Z'[v,n]} \qquad \text{[Equation 16]}$$

In equations 15 and 16, Z' is as follows. When argument n is argument a, matrix Z' is the restore matrix X'. When argument n is argument b, matrix Z' is the restore matrix Y'.

Then, the score calculation unit 152 calculates an inter-argument relationship on the basis of the factor matrices F and H. In detailed example 2, the score calculation unit 152 uses, as a relationship between arguments $a_m$ and $b_n$ of different cases, an inner product between a semantic vector for argument $a_m$ and a semantic vector for argument $b_n$ indicated below as equation 17. This inner product is an inner product between a row vector for argument $a_m$ (a semantic vector for argument $a_m$) of the factor matrix F and a row vector for argument $b_n$ (a semantic vector for argument $b_n$) of the factor matrix H.

$$r(a_m, b_n) = a_m \cdot b_n = \sum_k a_{mk} \times b_{nk} = \sum_k F[m,k] \times H[n,k] \qquad \text{[Equation 17]}$$

F[m, k] is an element in the m-th row and the k-th column of the factor matrix F. H[n, k] is an element in the n-th row and the k-th column of the factor matrix H.

The score calculation unit 152 calculates a score for a pair of predicate argument structures on the basis of the above-described inter-argument relationship and the relationship between partial structures indicated in equation 13.

Note that the score calculation unit 152 selects a pair of predicate argument structures for calculating a score, on the basis of a predetermined condition.

For example, the score calculation unit 152 may select a pair of predicate argument structures in which all components of a predicate argument structure included in the pair of predicate argument structures have non-negative values.

Alternatively, the score calculation unit 152 may select a pair of predicate argument structures in which all components (in detailed example 2, four components) included in the pair of predicate argument structures have a frequency of co-occurrence of equal to or greater than a threshold value.

An operation of the score calculation unit 152 will be described by using a more specific example.

For example, it is assumed that language data do not include a predicate argument structure (enter [predicate], a child [agent], school [goal]).

However, it is assumed that the language data include a predicate argument structure (enter [predicate], a child [agent]) and a predicate argument structure (enter [predicate], school [goal]).

In addition, it is assumed that the language data include a predicate argument structure (go [predicate], a child [agent], to school [goal]), a predicate argument structure (go [predicate], a child [agent]), and a predicate argument structure (go [predicate], to school [goal]).

In this case, an inter-argument relationship (r(child [agent], to school [goal])) is a high value at a certain degree. Further, a relationship between partial structures ($score_{part}$ (enter [predicate], go [predicate]; child [agent]) and $score_{part}$ (enter [predicate], go [predicate]; to school [goal])) also has a high value at a certain degree.

As a result, the score calculation unit 152 calculates a high score as $score_{CLSA}$(enter [predicate], go [predicate]; child [agent], to school [goal]).

Thus, the pair selection unit 160 can select, for example, a pair of predicate argument structures "(enter [predicate], child [agent], to school [goal])→(go [predicate], child [agent], to school [goal])".

In this way, the score calculation unit 152 can calculate a high score for a pair (a pair of predicate argument structures being potential co-occurrence) including a predicate argument structure having no co-occurrence observed in language data, on the basis of an inter-argument relationship and a relationship between partial structures.

Similarly to detailed example 1, the score calculation unit 152 may generate a pair of predicate argument structures including a collection of similar arguments (predicate argument structures including clustered arguments), and may use the pair of predicate argument structures as a pair of predicate argument structures.

Alternatively, the score calculation unit 152 may calculate a score for a pair of predicates as a score, in a way similar to detailed example 1.

Then, the pair selection unit 160 selects, from among pairs of predicate argument structures, a pair of predicate argument structures satisfying a predetermined condition, on the basis of a score.

<Hardware Configuration>

A hardware configuration of the above-described information processing devices 100 to 102 will be described by using the information processing device 100.

The information processing device 100 is configured as follows.

For example, each component of the information processing device 100 may be configured by a hardware circuit. Alternatively, in the information processing device 100, each component may be configured by using a plurality of devices connected via a network. Alternatively, in the information processing device 100, a plurality of components may be configured by one piece of hardware. Alternatively, the information processing device 100 may be implemented as a computer device that includes a central processing unit (CPU), a read only memory (ROM), and a random access memory (RAM). The information processing device 100 may be implemented as a computer device that further includes an input and output circuit (IOC) in addition to the above configuration. The information processing device 100 may be implemented as a computer device that further includes a network interface circuit (NIC) in addition to the above configuration.

Figure 15:
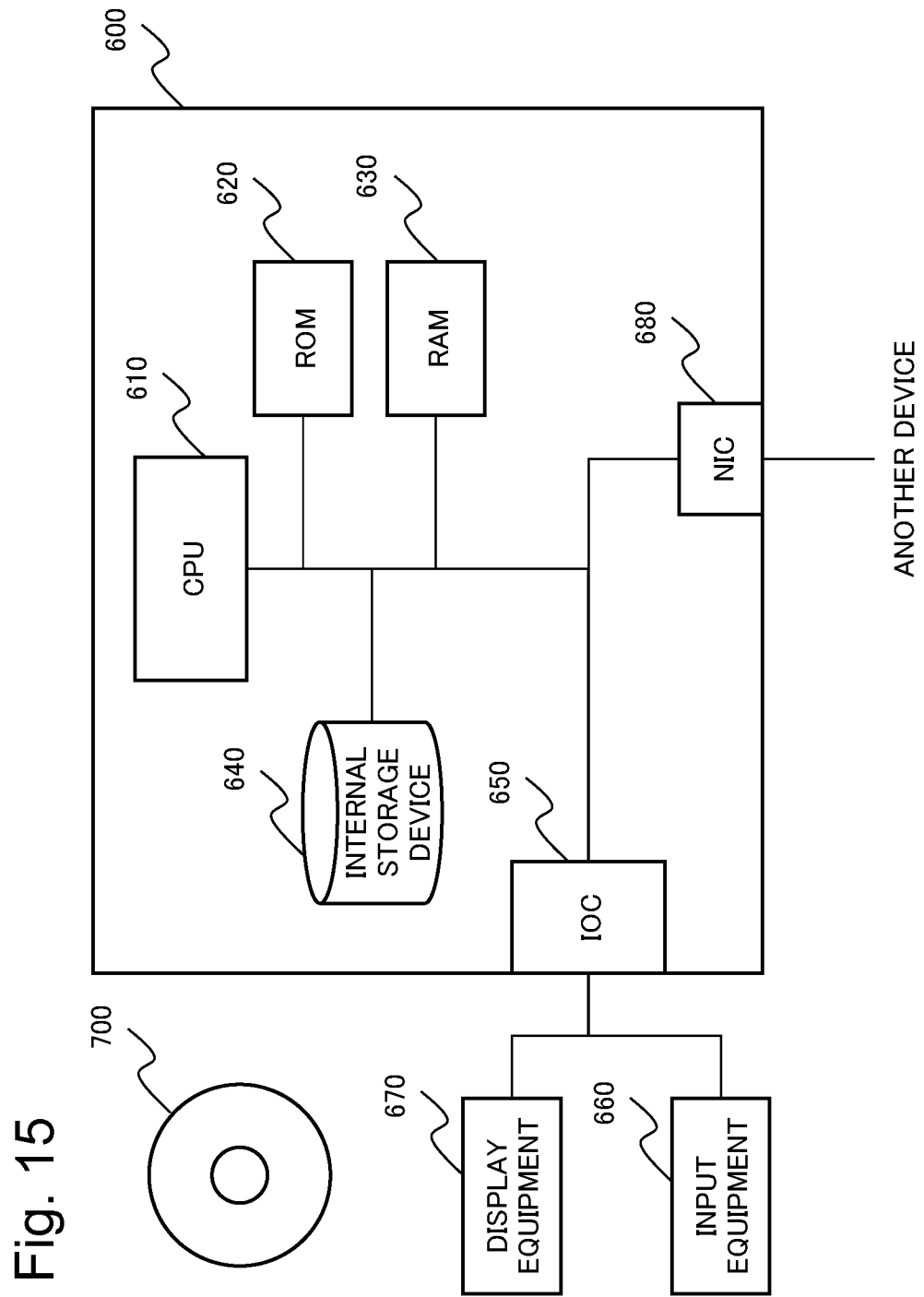
FIG. 15 is a block diagram illustrating one example of a hardware configuration of an information processing device.

FIG. 15 is a block diagram illustrating a configuration of an information processing device 600, which is one example of hardware configurations of the information processing devices 100 to 102.

The information processing device 600 includes a CPU 610, a ROM 620, a RAM 630, an internal storage device 640, an IOC 650, and an NIC 680, and constitutes a computer device.

The CPU 610 reads a program from the ROM 620. Then, the CPU 610 controls the RAM 630, the internal storage device 640, the IOC 650, and the NIC 680 on the basis of the read program. Then, a computer including the CPU 610 controls these configurations, and implements the functions as the structure generation unit 120, the co-occurrence generation unit 130, the potential generation unit 140, the score calculation unit 150, and the pair selection unit 160, which are illustrated in FIG. 1. Alternatively, a computer including the CPU 610 controls these configurations, and implements the functions as the structure generation unit 120, the co-occurrence generation unit 131, the potential generation unit 141, the score calculation unit 151, and the pair selection unit 160, which are illustrated in FIG. 10. Alternatively, a computer including the CPU 610 controls these configurations, and implements the functions as the structure generation unit 120, the co-occurrence generation unit 132, the potential generation unit 142, the score calculation unit 152, and the pair selection unit 160, which are illustrated in FIG. 12.

When implementing the functions, the CPU 610 may use the RAM 630 or the internal storage device 640 as a temporary storage medium for a program.

Further, the CPU 610 may read a program included in a recording medium 700 on which a program is stored in a computer-readable way, by using an unillustrated recording-medium reading device. Alternatively, the CPU 610 may receive a program from an unillustrated external device via the NIC 680, may store the received program in the RAM 630, and may operate on the basis of the stored program.

The ROM 620 stores fixed data and a program to be executed by the CPU 610. The ROM 620 is, for example, a programmable-ROM (P-ROM) or a flash ROM.

The RAM 630 temporarily stores data and a program be executed by the CPU 610. The RAM 630 is, for example, a dynamic-RAM (D-RAM).

The internal storage device 640 stores a program and data to be stored by the information processing device 600 for a long term. Further, the internal storage device 640 may operate as a temporary storage device for the CPU 610. The internal storage device 640 is, for example, a hard disk device, a magneto-optical disk device, a solid state drive (SSD), or a disk array device.

Herein, the ROM 620 and the internal storage device 640 are non-transitory storage media. Meanwhile, the RAM 630 is a transitory storage medium. Then, the CPU 610 is capable of operating on the basis of a program stored in the ROM 620, the internal storage device 640, or the RAM 630. In other words, the CPU 610 is capable of operating by using a non-transitory storage medium or a transitory storage medium.

The IOC 650 mediates data between the CPU 610 and input equipment 660 and between the CPU 610 and display equipment 670. The IOC 650 is, for example, an IO interface card or a universal serial bus (USB) card. In addition, the IOC 650 is not limited to be wired such as a USB, and may be wireless.

The input equipment 660 is equipment that receives an input instruction from an operator of the information processing device 600. The input equipment 660 is, for example, a keyboard, a mouse, or a touch panel.

The display equipment 670 is equipment that displays information to an operator of the information processing device 600. The display equipment 670 is, for example, a liquid crystal display.

The NIC 680 relays data exchange with an unillustrated external device via a network. The NIC 680 is, for example, a local area network (LAN) card. In addition, the NIC 680 is not limited to be wired, and may be wireless.

The information processing device 600 configured as described above can achieve an advantageous effect similar to the information processing devices 100 to 102.

The reason is that the CPU 610 of the information processing device 600 is able to implement functions similar to the information processing devices 100 to 102 on the basis of a program.

<Description of System>

Next, an information processing system 10 including the information processing devices 100 to 102 according to the present example embodiments will be described with reference to the drawings.

Figure 16:
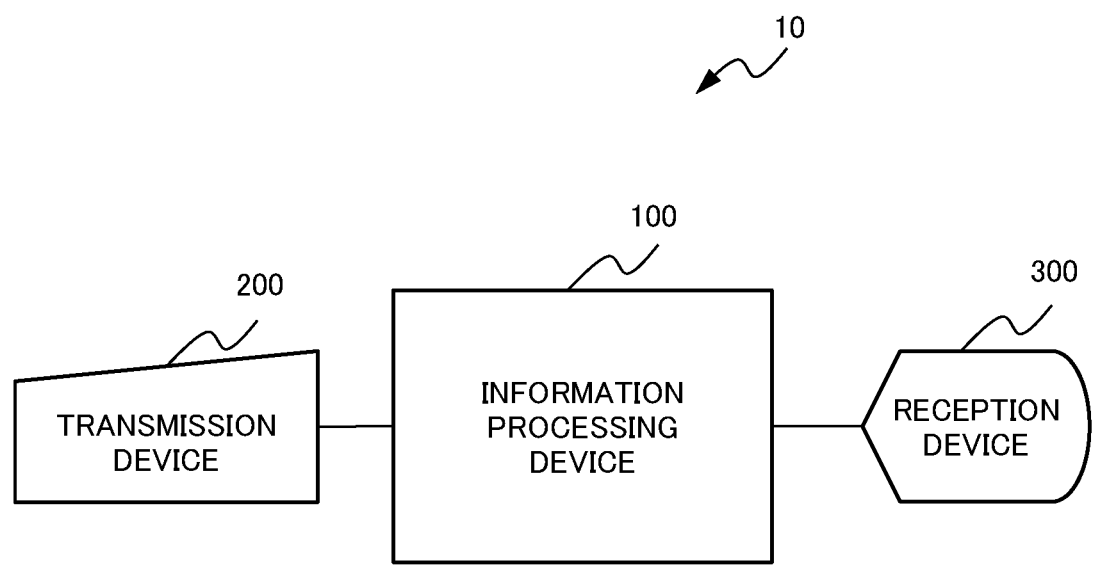
FIG. 16 is a diagram illustrating one example of a configuration of an information processing system according to the example embodiments of the present invention.

FIG. 16 is a diagram illustrating one example of a configuration of the information processing system 10 according to each of the example embodiments of the present invention. The information processing system 10 includes the information processing device 100 according to the first example embodiment, a transmission device 200, and a reception device 300. However, the information processing system 10 may use the information processing device 101 or 102 instead of the information processing device 100. In other words, the information processing system 10 includes any one of the information processing device 100 according to the first example embodiment to the information processing device 102 according to the third example embodiment, the transmission device 200, and the reception device 300.

The transmission device 200 is a source of provision of language data to be processed by the information processing device 100.

The transmission device 200 acquires language data. For example, the transmission device 200 may acquire or receive language data from a predetermined device. Alternatively, the transmission device 200 may generate language data by converting a signal from a predetermined voice acquisition device (for example, a microphone). Alternatively, the transmission device 200 may generate language data by converting character data in image data acquired by using a predetermined image acquisition device (for example, a scanner).

Then, the transmission device 200 transmits the language data to the information processing device 100.

The transmission device 200 may have any configuration. For example, the transmission device 200 is a scanner, a storage device, a database server, a search server, or the like.

The information processing device 100 receives the language data from the transmission device 200. Then, the information processing device 100 selects a pair of predicate argument structures on the basis of the above operation. Then, the information processing device 100 transmits the pair of predicate argument structures to the reception device 300.

The reception device 300 stores the received pair of predicate argument structures. For example, the reception device 300 is a storage device included in an inference device that executes predetermined inference, and stores the received pair of predicate argument structures on a predetermined-knowledge basis for use in inference.

Note that the reception device 300 may output (for example, display) the received pair of predicate argument structures.

Note that the transmission device 200 and/or the reception device 300 are not limited to an external device of the information processing device 100, and may be included in the information processing device 100.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 Information processing system
100 Information processing device
101 Information processing device
102 Information processing device
120 Structure generation unit
130 Co-occurrence generation unit
131 Co-occurrence generation unit
132 Co-occurrence generation unit
140 Potential generation unit
141 Potential generation unit
142 Potential generation unit
150 Score calculation unit
151 Score calculation unit
152 Score calculation unit
160 Pair selection unit
200 Transmission device
300 Reception device
600 Information processing device
610 CPU
620 ROM
630 RAM
640 Internal storage device
650 IOC
660 Input equipment
670 Display equipment
680 NIC
700 Recording medium

The invention claimed is:

1. An information processing device comprising:
a memory; and
at least one processor coupled to the memory,
the processor performing operations, the operations comprising:
  generating, based on language data, a predicate argument structure including a predicate and an argument being an object of the predicate;
  generating first data indicating co-occurrence of the predicate and the argument in the predicate argument structure;
  the first data into a plurality of pieces of second data including fewer elements than elements included in the first data, and generating, based on the second data, third data including potential co-occurrence of the predicate and the argument;
  selecting the predicate argument structure by using the first data and the third data, and calculating, by using the third data, a score for a pair of the predicate argument structures including the selected predicate argument structure; and
  selecting the pair, based on the score, wherein the operations further comprise:
  calculating, as the first data, an original co-occurrence tensor including the predicate and the argument as modes;
  decomposing, as the second data, the original co-occurrence tensor into factor tensors of lower rank than a rank of the original co-occurrence tensor, and generating, as the third data, a restore tensor being a product of the factor tensors;
  generating, as the original co-occurrence tensor, a plurality of the original co-occurrence tensors including the predicate and any one of the arguments as modes;
  decomposing the original co-occurrence tensor into the factor tensors in such a way that at least some of the factor tensors are an identical tensor in all the original co-occurrence tensors; and
  calculating, based on the restore tensor, a probability of appearance for each of the predicate and the argument, calculating a relationship between a plurality of arguments by using the factor tensors, and calculating the score by using the probability of appearance and the relationship.

2. The information processing device according to claim 1, wherein the operations further comprise
  generating, as the original co-occurrence tensor, the original co-occurrence tensor including all the predicates and all the arguments as modes, and
  calculating the score by using a probability of appearance for each of the predicate and the argument in the restore tensor.

3. An information processing method comprising:
  generating, based on language data, a predicate argument structure including a predicate and an argument being an object of the predicate;
  generating first data indicating co-occurrence of the predicate and the argument in the predicate argument structure;
  decomposing the first data into a plurality of pieces of second data including fewer elements than elements included in the first data;
  generating, based on the second data, third data including potential co-occurrence of the predicate and the argument;
  selecting the predicate argument structure by using the first data and the third data;
  calculating, by using the third data, a score for a pair of the predicate argument structures including the selected predicate argument structure; and
  selecting the pair, based on the score,
  wherein the method further comprises:
    calculating, as the first data, an original co-occurrence tensor including the predicate and the argument as modes;
    decomposing, as the second data, the original co-occurrence tensor into factor tensors of lower rank than a rank of the original co-occurrence tensor, and generating, as the third data, a restore tensor being a product of the factor tensors;
    generating, as the original co-occurrence tensor, a plurality of the original co-occurrence tensors including the predicate and any one of the arguments as modes;
    decomposing the original co-occurrence tensor into the factor tensors in such a way that at least some of the factor tensors are an identical tensor in all the original co-occurrence tensors; and
    calculating, based on the restore tensor, a probability of appearance for each of the predicate and the argument, calculating a relationship between a plurality of arguments by using the factor tensors, and calculating the score by using the probability of appearance and the relationship.

4. A non-transitory computer-readable recording medium embodying a program, the program causing a computer to perform a method, the method comprising:
  generating, based on language data, a predicate argument structure including a predicate and an argument being an object of the predicate;
  generating first data indicating co-occurrence of the predicate and the argument in the predicate argument structure;
  decomposing the first data into a plurality of pieces of second data including fewer elements than elements included in the first data;
  generating, based on the second data, third data including potential co-occurrence of the predicate and the argument;
  selecting the predicate argument structure by using the first data and the third data;
  calculating, by using the third data, a score for a pair of the predicate argument structures including the selected predicate argument structure; and
  selecting the pair, based on the score,
  wherein the method further comprises:
    calculating, as the first data, an original co-occurrence tensor including the predicate and the argument as modes;
    decomposing, as the second data, the original co-occurrence tensor into factor tensors of lower rank than a rank of the original co-occurrence tensor, and generating, as the third data, a restore tensor being a product of the factor tensors;
    generating, as the original co-occurrence tensor, a plurality of the original co-occurrence tensors including the predicate and any one of the arguments as modes;
    decomposing the original co-occurrence tensor into the factor tensors in such a way that at least some of the factor tensors are an identical tensor in all the original co-occurrence tensors; and
    calculating, based on the restore tensor, a probability of appearance for each of the predicate and the argument, calculating a relationship between a plurality of arguments by using the factor tensors, and calculating the score by using the probability of appearance and the relationship.

* * * * *